(12) United States Patent
Si

(10) Patent No.: US 11,558,831 B2
(45) Date of Patent: Jan. 17, 2023

(54) METHOD AND APPARATUS FOR S-SSB TRANSMISSION

(71) Applicant: Samsung Electronics Co., Ltd., Suwon-si (KR)

(72) Inventor: Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 16/946,300

(22) Filed: Jun. 15, 2020

(65) Prior Publication Data

US 2021/0076341 A1 Mar. 11, 2021

Related U.S. Application Data

(60) Provisional application No. 62/968,338, filed on Jan. 31, 2020, provisional application No. 62/966,809, (Continued)

(51) Int. Cl.
*H04W 56/00* (2009.01)
*H04L 5/00* (2006.01)
(Continued)

(52) U.S. Cl.
CPC ......... *H04W 56/001* (2013.01); *H04L 1/1642* (2013.01); *H04L 5/0051* (2013.01);
(Continued)

(58) Field of Classification Search
CPC ............. H04W 56/001; H04W 72/005; H04W 72/0446; H04W 72/0453; H04W 72/0466;
(Continued)

(56) References Cited

U.S. PATENT DOCUMENTS

| 2019/0141693 | A1 | 5/2019 | Guo et al. |
| 2021/0168574 | A1* | 6/2021 | Zhang ................. H04W 56/001 |
| 2021/0235403 | A1* | 7/2021 | Lee ................... H04W 56/0015 |

OTHER PUBLICATIONS

ITL Discussion on sidelink synchronization mechanism for NR V2X, 3GPP TSG RAN WG1 #98 R1-1909307 Aug. 2019 (Year: 2019).*

(Continued)

*Primary Examiner* — Rina C Pancholi

(57) ABSTRACT

A method and apparatus of a user equipment (UE) in a wireless communication system are provided. The method and apparatus comprise: receiving a set of higher layer parameters including configuration information for sidelink synchronization signals and physical sidelink broadcast channel (S-SS/PSBCH) block; determining, based on the configuration information for the S-SS/PSBCH block, a number of transmitted S-SS/PSBCH blocks ($N_{SSB}$), an offset for transmitted S-SS/PSBCH blocks ($O_{SSB}$), and an interval for transmitted S-SS/PSBCH blocks ($D_{SSB}$); and determining a set of slots containing the transmitted S-SS/PSBCH blocks within a period for a transmission of the S-SS/PSBCH block, wherein an index of a slot in the set of slots is determined based on $O_{SSB}+I_{SSB}*D_{SSB}$, where $I_{SSB}$ is an index of the S-SS/PSBCH block with $0 \leq I_{SSB} \leq N_{SSB}-1$.

20 Claims, 26 Drawing Sheets

Related U.S. Application Data filed on Jan. 28, 2020, provisional application No. 62/942,535, filed on Dec. 2, 2019, provisional application No. 62/902,045, filed on Sep. 18, 2019, provisional application No. 62/900,995, filed on Sep. 16, 2019, provisional application No. 62/899,461, filed on Sep. 12, 2019, provisional application No. 62/898,493, filed on Sep. 10, 2019.

(51) Int. Cl.
  *H04L 5/10* (2006.01)
  *H04L 1/16* (2006.01)
  *H04W 80/08* (2009.01)
  *H04W 72/04* (2009.01)
  *H04W 72/00* (2009.01)
  *H04W 92/18* (2009.01)

(52) U.S. Cl.
  CPC .............. *H04L 5/0092* (2013.01); *H04L 5/10* (2013.01); *H04W 72/005* (2013.01); *H04W 72/0446* (2013.01); *H04W 72/0453* (2013.01); *H04W 72/0466* (2013.01); *H04W 80/08* (2013.01); *H04W 92/18* (2013.01)

(58) Field of Classification Search
  CPC . H04W 80/08; H04W 92/18; H04W 72/0406; H04W 72/0493; H04W 4/40–48; H04L 1/1642; H04L 5/0051; H04L 5/0092; H04L 5/10; H04L 5/0007; H04L 5/0048; H04L 5/0053; H04L 5/0078; H04L 5/0094; H04L 5/001; H04L 5/005
  See application file for complete search history.

(56) References Cited

OTHER PUBLICATIONS

LG Discussion in NR sidelink synchronization mechanism, 3gpp TSG RAN WG1 #98, R1-1909518 Aug. 2019 (Year: 2019).*
International Search Report of the International Searching Authority dated Dec. 11, 2020 in connection with International Application No. PCT/KR2020/012227, 3 pages.
Catt, et al., "Sidelink synchronization mechanism in NR V2X," R1-1908582, 3GPP TSG RAN WG1 Meeting #98, Prague, CZ, Aug. 26-30, 2019, 13 pages.
ITL, "Discussion on sidelink synchronization mechanism for NR V2X," R1-1909307, 3GPP TSG RAN WG1 #98 meeting, Prague, CZ, Aug. 26-30, 2019, 6 pages.
LG Electronics, "Discussion on NR sidelink synchronization mechanism," R1-1909518, 3GPP TSG RAN WG1 #98 meeting, Prague, Aug. 26-30, 2019, 18 pages.
Zte, et al., "Discussion on synchronization mechanism in NR V2X," R1-1908895, 3GPP TSG RAN WG1 #98, Prague, CZ, Aug. 26-30, 2019, 11 pages.
"3rd Generation Partnership Project; Technical Specification Group Radio Access Network; NR; Physical channels and modulation (Release 15)", 3GPP TS 38.211 V15.6.0, Jun. 2019, 97 pages.
"3rd Generation Partnership Project; Technical Specification Group Radio Access Network; NR; Multiplexing and channel coding (Release 15)", 3GPP TS 38.212 V15.6.0, Jun. 2019, 101 pages.
"3rd Generation Partnership Project; Technical Specification Group Radio Access Network; NR; Physical layer procedures for control (Release 15)" 3GPP TS 38.213 V15.6.0, Jun. 2019, 107 pages.
"3rd Generation Partnership Project; Technical Specification Group Radio Access Network; NR; Physical layer procedures for data (Release 15)", 3GPP TS 38.214 V15.6.0, Jun. 2019 105 pages.
"3rd Generation Partnership Project; Technical Specification Group Radio Access Network; NR; Radio Resource Control (RRC) protocol specification (Release 15)", 3GPP TS 38.331 V15.6.0, Jun. 2019, 519 pages.
European Patent Office, "Supplementary European Search Report" dated Dec. 8, 2021, in connection with European Patent Application No. 20863126.7, 12 pages.
Catt, "Feature lead summary on AI 7.2.4.3 #2 Sidelink synchronization mechanism", 3GPP TSG RAN WG1 Meeting #100bis, R1-2002396, e-Meeting, Apr. 20-30, 2020, 26 pages.
Catt, "Feature lead summary #1 on AI 7.2.4.3 Sidelink synchronization mechanism", 3GPP TSG RAN WG1 Meeting #100bis, R1-2002395, e-Meeting, Apr. 20-30, 2020, 36 pages.
Samsung, "On Synchronization Mechanisms for NR Sidelink", 3GPP TSG RAN WG1 Meeting #100bis-e, R1-2002127, e-Meeting, Apr. 20-30, 2020, 6 pages.

* cited by examiner

METHOD AND APPARATUS FOR S-SSB TRANSMISSION

CROSS-REFERENCE TO RELATED APPLICATIONS AND CLAIM OF PRIORITY

The present application claims priority to:
U.S. Provisional Patent Application Ser. No. 62/898,493, filed on Sep. 10, 2019;
U.S. Provisional Patent Application Ser. No. 62/899,461, filed on Sep. 12, 2019;
U.S. Provisional Patent Application Ser. No. 62/900,995, filed on Sep. 16, 2019;
U.S. Provisional Patent Application Ser. No. 62/902,045, filed on Sep. 18, 2019;
U.S. Provisional Patent Application Ser. No. 62/942,535, filed on Dec. 2, 2019;
U.S. Provisional Patent Application Ser. No. 62/966,809, filed on Jan. 28, 2020; and
U.S. Provisional Patent Application Ser. No. 62/968,338, filed on Jan. 31, 2020. The content of the above-identified patent documents are incorporated herein by reference.

TECHNICAL FIELD

The present application relates generally to wireless communication systems, more specifically, the present disclosure relates to S-SSB transmission.

BACKGROUND

A communication system includes a downlink (DL) that conveys signals from (UL) that conveys signals from UEs to reception points such as NodeBs. A UE, also commonly referred to as a terminal or a mobile station, may be fixed or mobile and may be a cellular phone, a personal computer device, or an automated device. An eNodeB (eNB), referring to a NodeB in long-term evolution (LTE) communication system, and a gNodeB (gNB), referring to a NodeB in new radio (NR) communication system, may also be referred to as an access point or other equivalent terminology.

SUMMARY

The present disclosure relates to a pre-5G or 5G communication system to be provided for an S-SSB transmission.

In one embodiment, a user equipment (UE) in a wireless communication system is provided. The UE comprises a transceiver configured to receive a set of higher layer parameters including configuration information for sidelink synchronization signals and physical sidelink broadcast channel (S-SS/PSBCH) block. The UE further comprises a processor operably connected to the transceiver, the processor configured to: determine, based on the configuration information for the S-SS/PSBCH block, a number of transmitted S-SS/PSBCH blocks ($N_{SSB}$), an offset for transmitted S-SS/PSBCH blocks ($O_{SSB}$), and an interval for transmitted S-SS/PSBCH blocks ($D_{SSB}$), and determine a set of slots containing the transmitted S-SS/PSBCH blocks within a period for a transmission of the S-SS/PSBCH block, wherein an index of a slot in the set of slots is determined based on $O_{SSB}+I_{SSB}*D_{SSB}$, where $I_{SSB}$ is an index of the S-SS/PSBCH block with $0 \leq I_{SSB} \leq N_{SSB}-1$.

In another embodiment, a method of a user equipment (UE) in a wireless communication system is provided. The method comprises: receiving a set of higher layer parameters including configuration information for sidelink synchronization signals and physical sidelink broadcast channel (S-SS/PSBCH) block; determining, based on the configuration information for the S-SS/PSBCH block, a number of transmitted S-SS/PSBCH blocks ($N_{SSB}$), an offset for transmitted S-SS/PSBCH blocks ($O_{SSB}$), and an interval for transmitted S-SS/PSBCH blocks ($D_{SSB}$); and determining a set of slots containing the transmitted S-SS/PSBCH blocks within a period for a transmission of the S-SS/PSBCH block, wherein an index of a slot in the set of slots is determined based on $O_{SSB}+I_{SSB}*D_{SSB}$, where $I_{SSB}$ is an index of the S-SS/PSBCH block with $0 \leq I_{SSB} \leq N_{SSB}-1$.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 32, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.6.0, "NR; Physical channels and modulation;" 3GPP TS 38.212 v15.6.0, "NR; Multiplexing and Channel coding;" 3GPP TS 38.213 v15.6.0, "NR; Physical Layer Procedures for Control;" 3GPP TS 38.214 v15.6.0, "NR; Physical Layer Procedures for Data;" and 3GPP TS 38.331 v15.6.0, "NR; Radio Resource Control (RRC) Protocol Specification."

Figure 1:
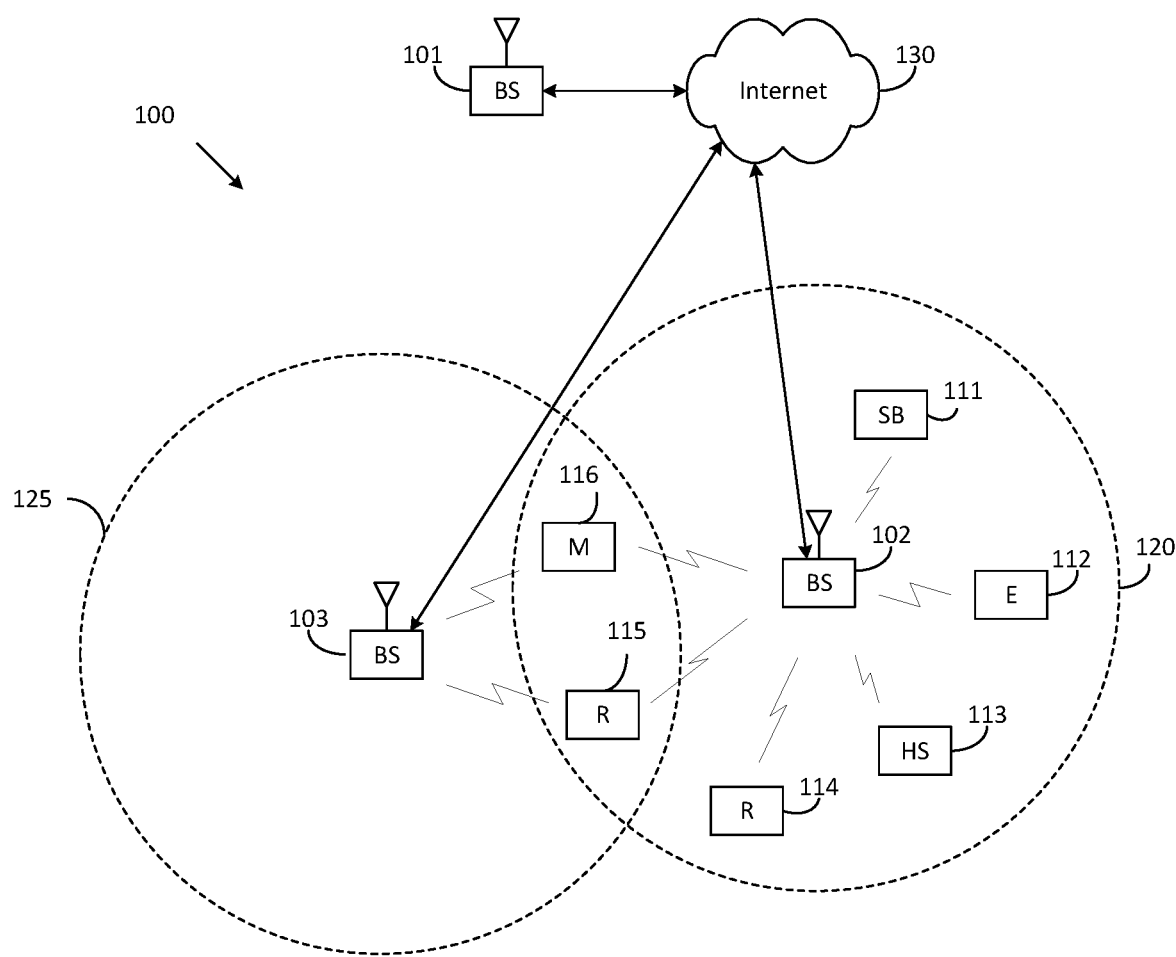
FIG. 1 illustrates an example wireless network according to embodiments of the present disclosure.
Figure 2:
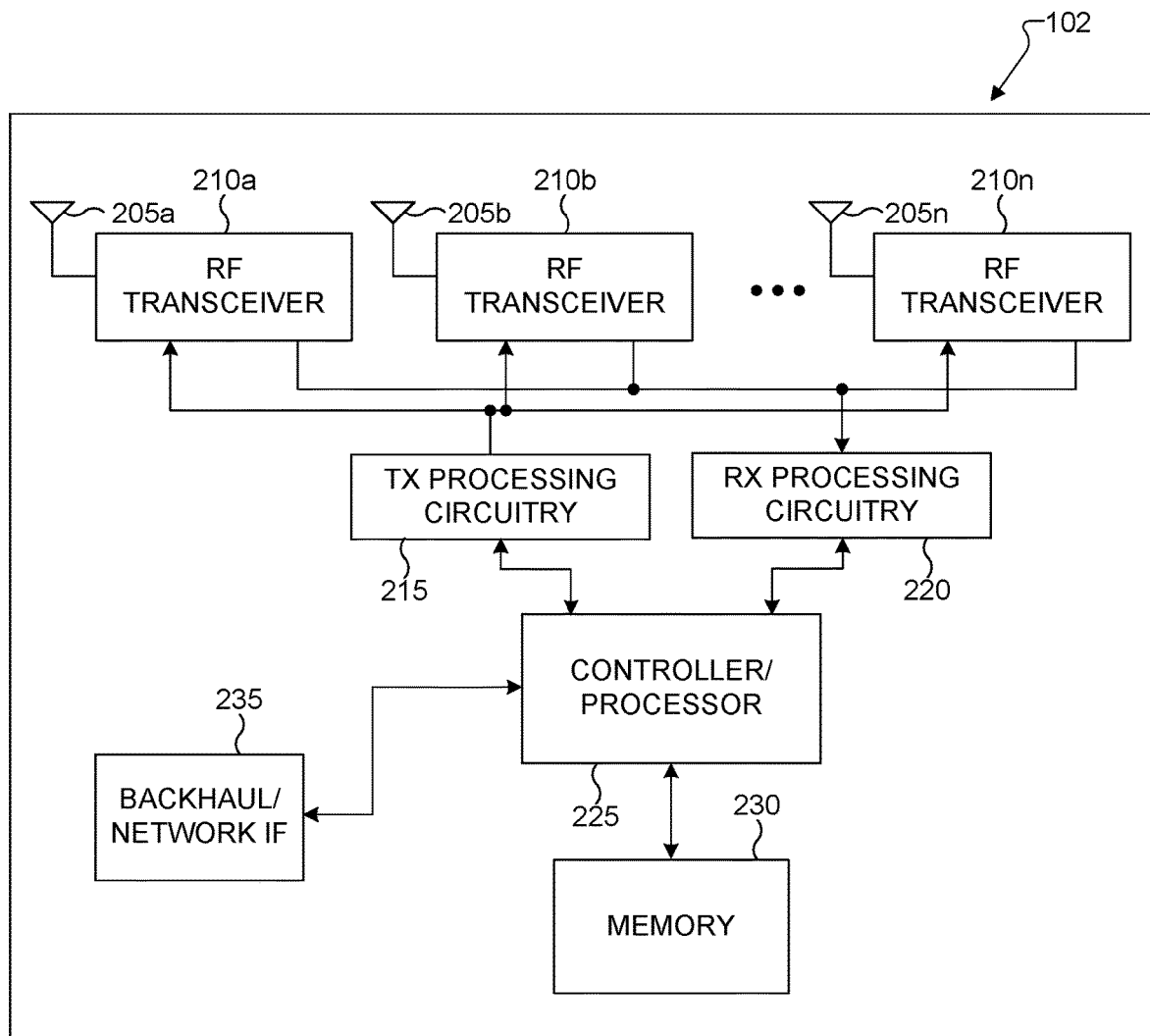
FIG. 2 illustrates an example gNB according to embodiments of the present disclosure.
Figure 3:
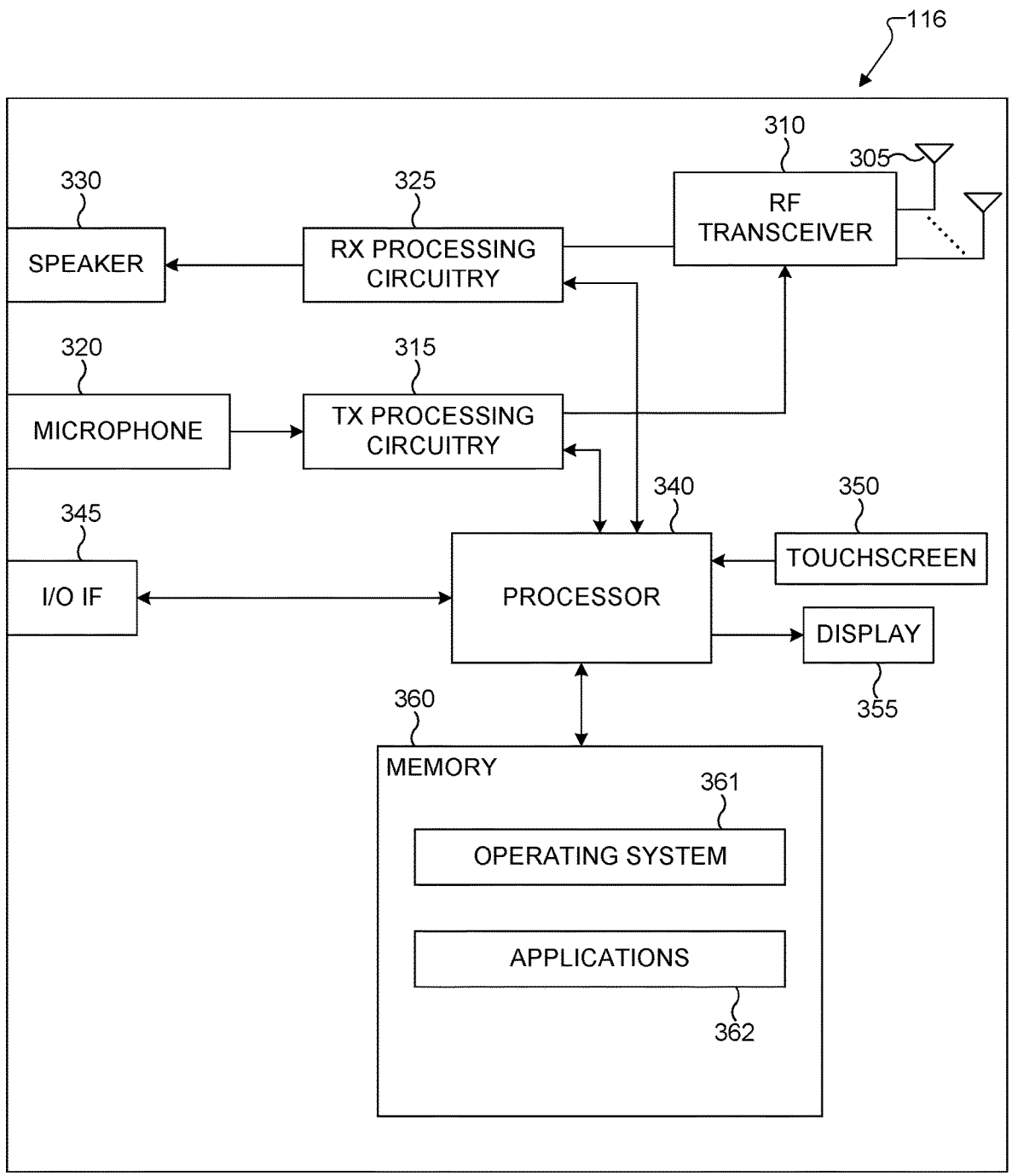
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
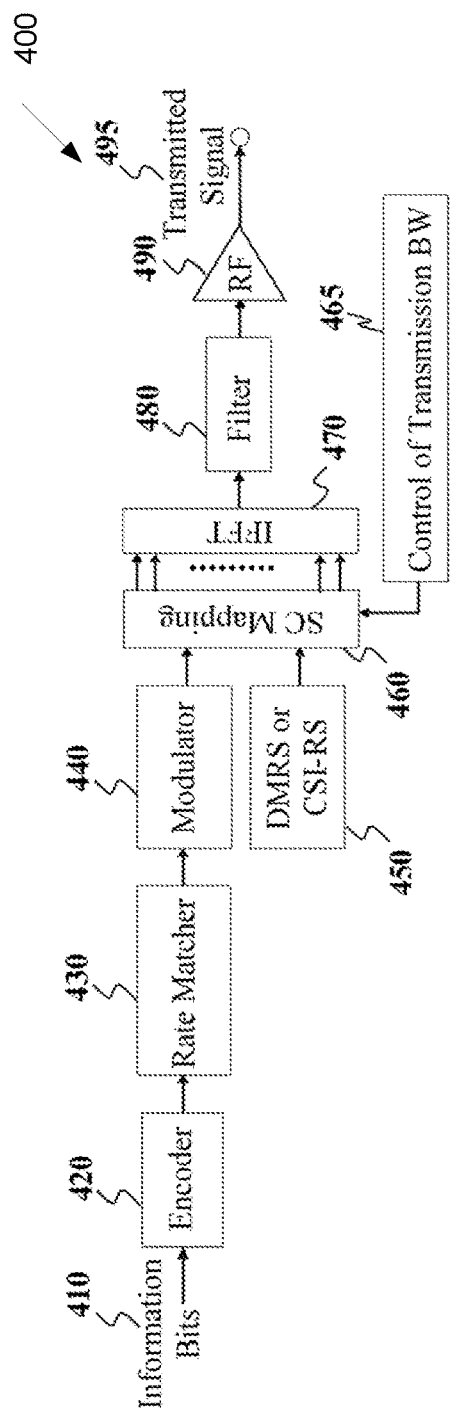
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping unit 465, an inverse fast Fourier transform (IFFT) is performed by filter 470, a cyclic prefix (CP) is added by CP insertion unit 480, and a resulting signal is filtered by filter 490 and transmitted by a radio frequency (RF) unit 495.

Figure 5:
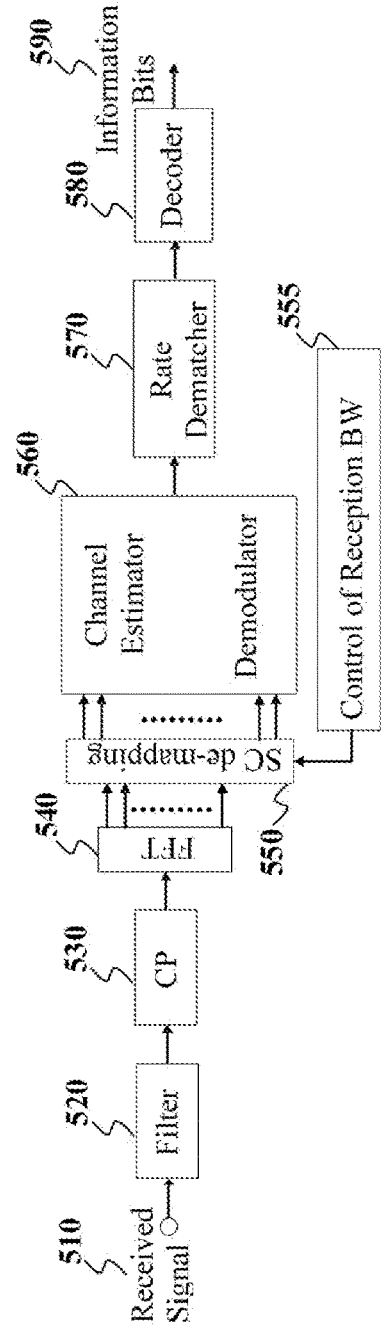
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal unit removes a CP 530, a filter 540 applies a fast Fourier transform (FFT), SCs de-mapping unit 550 de-maps SCs selected by BW selector unit 555, received symbols are demodulated by a channel estimator and a demodulator unit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
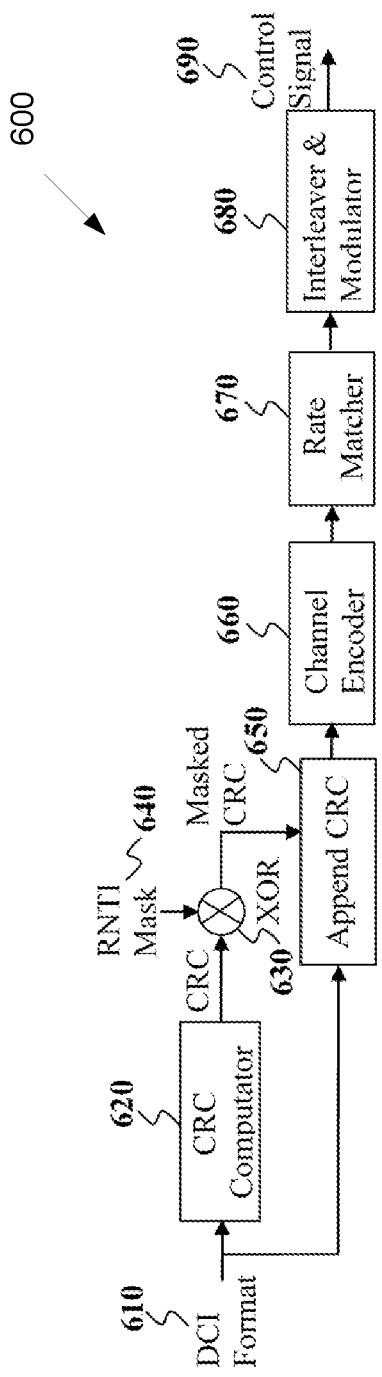
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation unit 620, and the CRC is masked using an exclusive OR (XOR) operation unit 630 between CRC bits and RNTI bits 640. The XOR operation is defined as XOR (0, 0)=0, XOR (0, 1)=1, XOR (1, 0)=1, XOR (1, 1)=0. The masked CRC bits are appended to DCI format information bits using a CRC append unit 650. An encoder 660 performs channel coding (such as tail-biting convolutional coding or polar coding), followed by rate matching to allocated resources by rate matcher 670. Interleaving and modulation units 680 apply interleaving and modulation, such as QPSK, and the output control signal 690 is transmitted.

Figure 7:
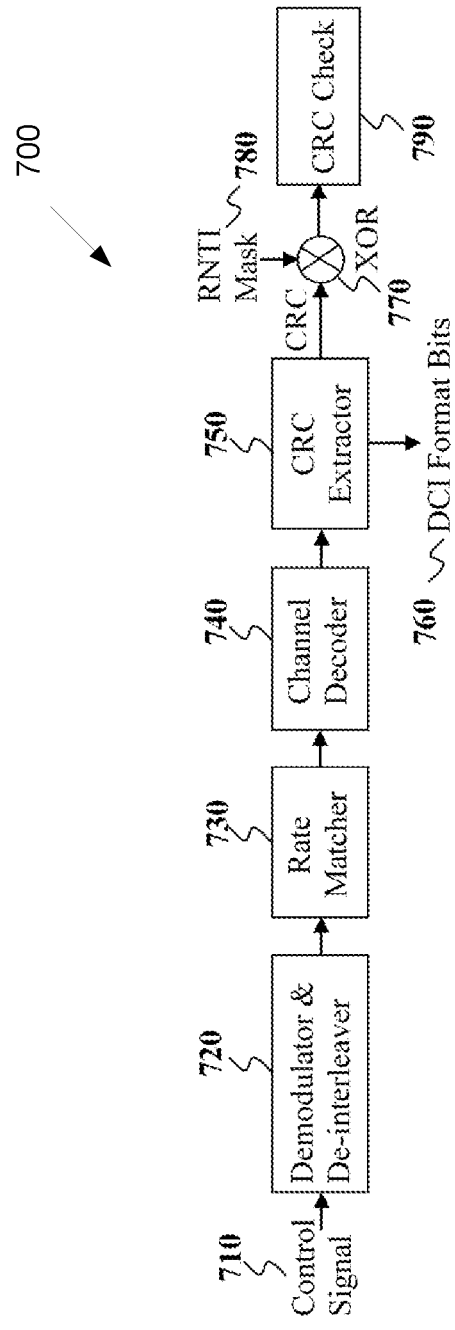
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by unit 790. When the CRC check succeeds (checksum is zero), the DCI format information bits are considered to be valid. When the CRC check does not succeed, the DCI format information bits are considered to be invalid.

Traditionally, cellular communication networks have been designed to establish wireless communication links between mobile user equipments (UEs) and fixed communication infrastructure components (such as base stations (BSs) or access points (APs)) that serve UEs in a wide or local geographic range. However, a wireless network can also be implemented by utilizing only device-to-device (D2D) communication links without the need for fixed infrastructure components. This type of network is typically referred to as an "ad-hoc" network.

A hybrid communication network can support devices that connect both to fixed infrastructure components and to other D2D-enabled devices. While UEs such as smartphones can be envisioned for D2D networks, vehicular communication can also be supported by a communication protocol where vehicles exchange control or data information with other vehicles or other infrastructure or UEs. Such a network is referred to as a vehicle-to-everything (V2X) network. Multiple types of communication links can be supported by nodes supporting V2X in the network and can utilize same or different protocols and systems.

Figure 8:
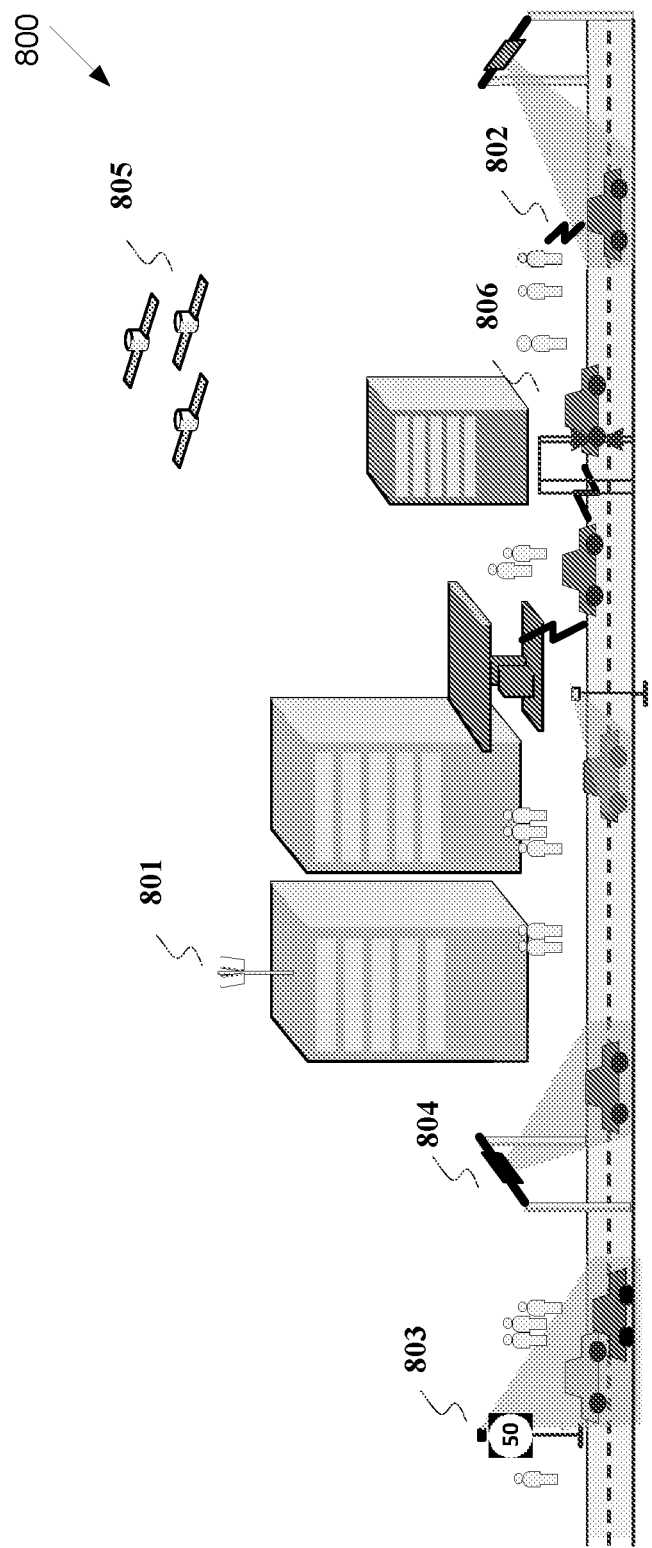
FIG. 8 illustrates an example use case of a vehicle-centric communication network according to embodiments of the present disclosure.

FIG. 8 illustrates an example use case of a vehicle-centric communication network 800 according to embodiments of the present disclosure. An embodiment of the use case of a vehicle-centric communication network 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

FIG. 8 illustrates an example use case of a vehicle-centric communication network according to illustrative embodiments of the present disclosure.

The vehicular communication, referred to as vehicle-to-everything (V2X), contains the following three different types: 1) vehicle-to-vehicle (V2V) communications; 2) vehicle-to-infrastructure (V2I) communications; and 3) vehicle-to-pedestrian (V2P) communications. These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving. Direct communication between vehicles in V2V is based on a sidelink (SL) interface, and SL is the UE to UE interface for synchronization, discovery, and communication.

Figure 9:
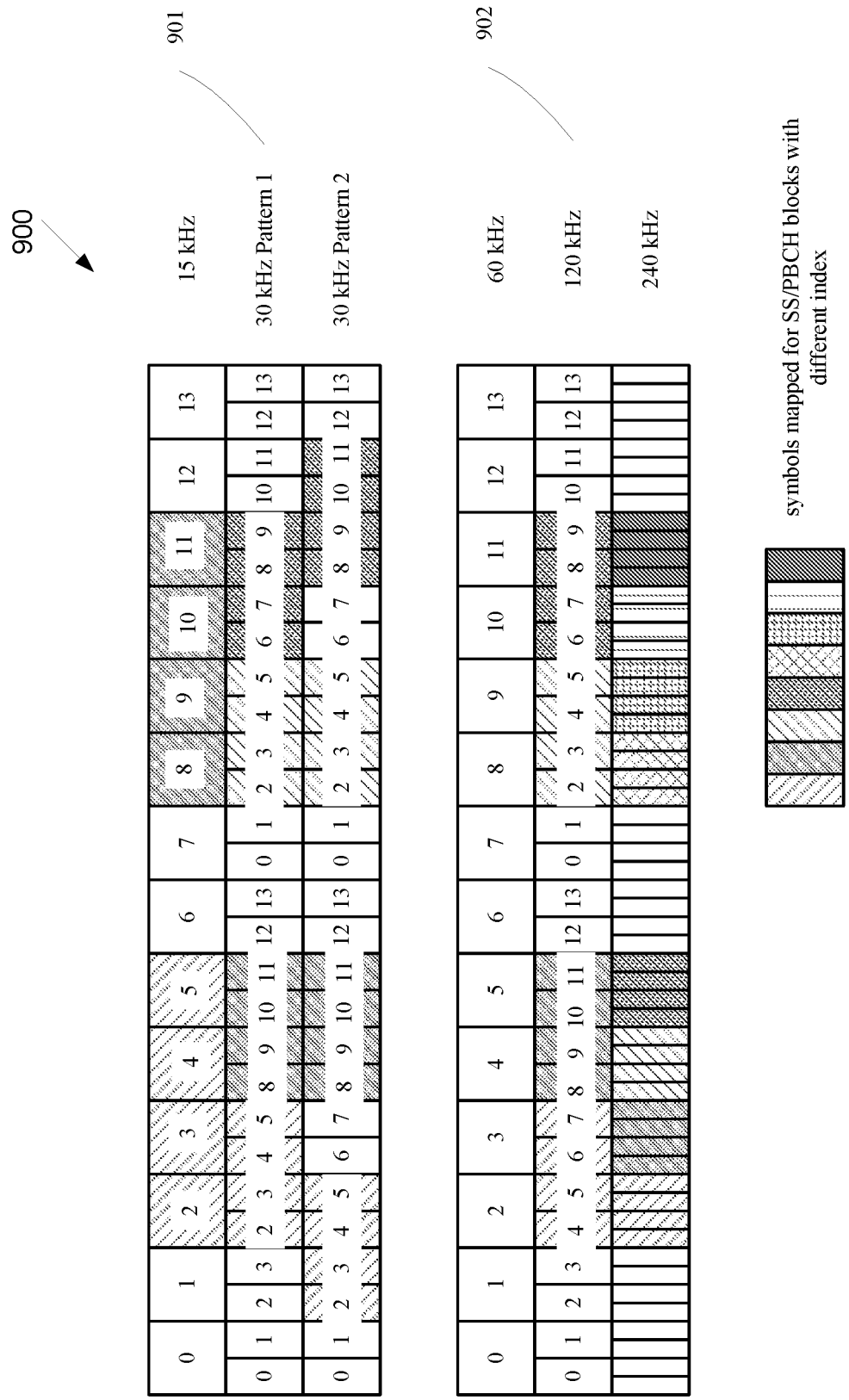
FIG. 9 illustrates an example mapping pattern of SS/PBCH block in a slot according to embodiments of the present disclosure.

FIG. 9 illustrates an example mapping pattern of SS/PBCH block in a slot 900 according to embodiments of the present disclosure. An embodiment of the mapping pattern of SS/PBCH block in a slot 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

In new radio (NR) Rel-15, SS/PBCH blocks could be transmitted in a beam-sweeping way up to network implementation, and multiple candidate location for transmitting SS/PBCH blocks are predefined within a unit of half frame. The mapping pattern of SS/PBCH blocks to 1 slot with respect to 15 kHz as the reference SCS for sub6 GHz and with respect to 60 kHz as the reference SCS for above 6 GHz are illustrated in 901 and 902 of FIG. 9, respectively. Two mapping patterns are designed for 30 kHz SS SCS: Pattern 1 is utilized for non-LTE-NR coexistence bands, and Pattern 2 is utilized for LTE-NR coexistence bands.

The maximum number of SS/PBCH blocks, denoted as L_SSB, is determined based on carrier frequency range: for carrier frequency range 0 GHz to 3 GHz, L_SSB is 4; for carrier frequency range 3 GHz to 6 GHz, L_SSB is 8; for carrier frequency range 6 GHz to 52.6 GHz, L_SSB is 64. The determination of the slots within the half frame unit which contains the candidate locations of SS/PBCH blocks, with respect to each combination of SS SCS and L_SSB, is illustrated in FIG. 10.

Figure 10:
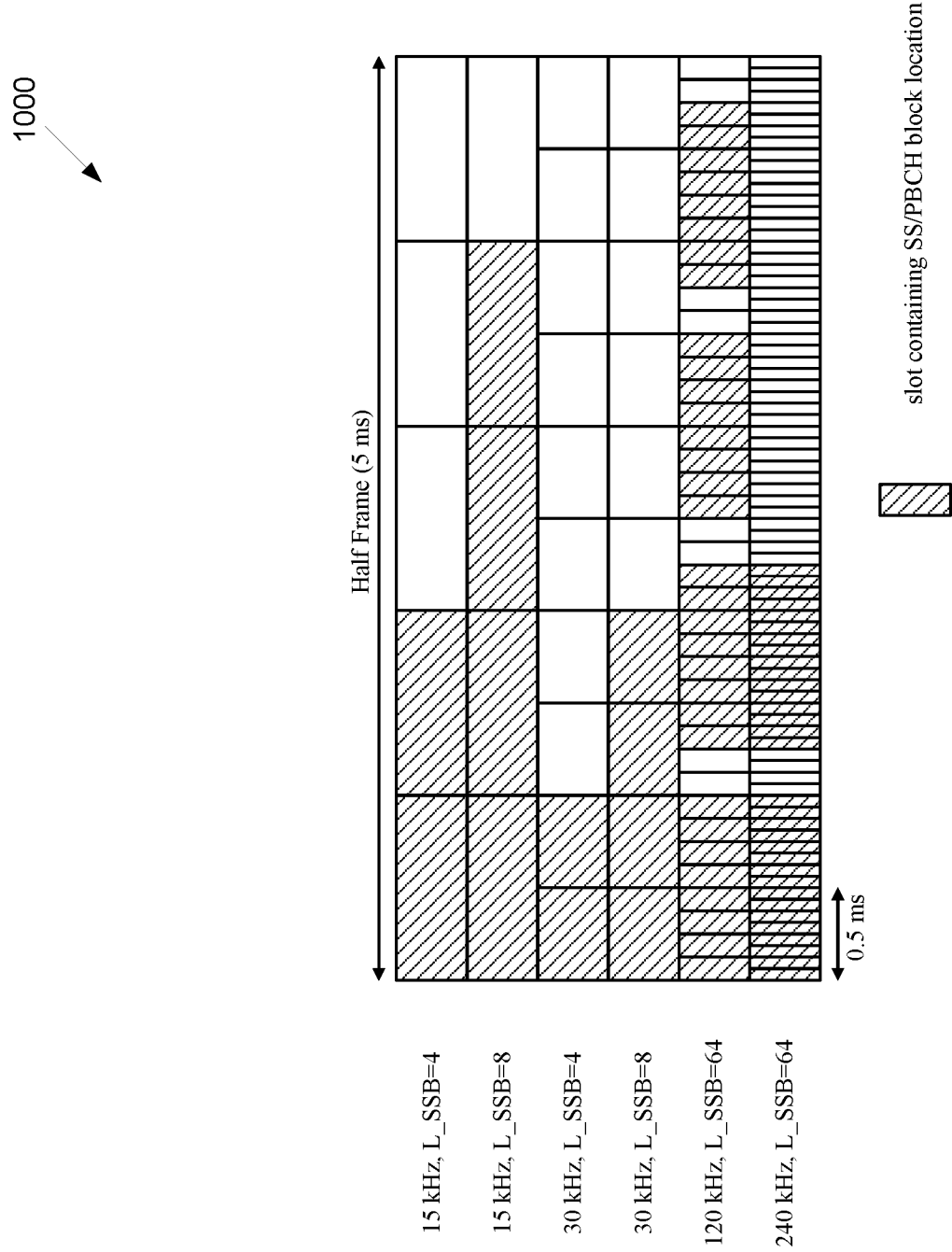
FIG. 10 illustrates an example mapping pattern of SS/PBCH block in a half frame according to embodiments of the present disclosure.

FIG. 10 illustrates an example mapping pattern of SS/PBCH block in a half frame 1000 according to embodiments of the present disclosure. An embodiment of the mapping pattern of SS/PBCH block in a half frame 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

In initial cell selection, a UE assumes a default SS burst set periodicity as 20 ms, and for detecting non-standalone NR cell, a network provides one SS burst set periodicity information per frequency carrier to the UE and information to derive measurement timing/duration if possible.

In NR V2X, the synchronization signals on NR sidelink can use the synchronization signals on downlink as a baseline, and potential enhancement and/or modification to address the exclusive requirement for V2X can be supported. This present disclosure focuses on the design of the transmission of sidelink SS/PBCH block (S-SSB).

This present disclosure focuses on the design of the transmission of sidelink SS/PBCH block (S-SSB), wherein the following components are detailed in the disclosure: transmission patterns; configurability of the transmission patterns; QCL assumption in the transmission of S-SSB; scalable transmission with respect to SCS; and timing determination in S-SSB.

In one embodiment, the transmission of sidelink synchronization signals and physical broadcast channel blocks (S-SSB) is periodical, wherein the periodicity can be fixed as P_SSB (e.g., P_SSB=160 ms), and the transmission of S-SSBs are within a S-SSB period with duration same as the periodicity. Within a S-SSB period (e.g., P_SSB), the number of transmitted S-SSB can be (pre-)configurable within a set of predefined values, wherein the maximum (pre-) configurable value is fixed per supported subcarrier spacing (SCS) of S-SSB and per carrier frequency range (FR). In this disclosure, denote the maximum number of (pre-)configurable S-SSBs for a given SCS and a given FR as M_SSB, and denote the (pre-)configured number of transmitted S-SSB as N_SSB, wherein N_SSB≤M_SSB, and M_SSB can be dividable by N_SSB (i.e., M_SSB mod N_SSB=0).

At least one of the examples and/or embodiments for the transmission pattern of S-SSB in this disclosure can be supported, and the transmission pattern can be (pre-)configurable if multiple transmission patterns of S-SSB are supported.

In one example, the transmission of N_SSB number of S-SSBs is consecutive in time domain, e.g., the transmission of S-SSBs occupies N_SSB consecutive slots in time domain.

Figure 11:
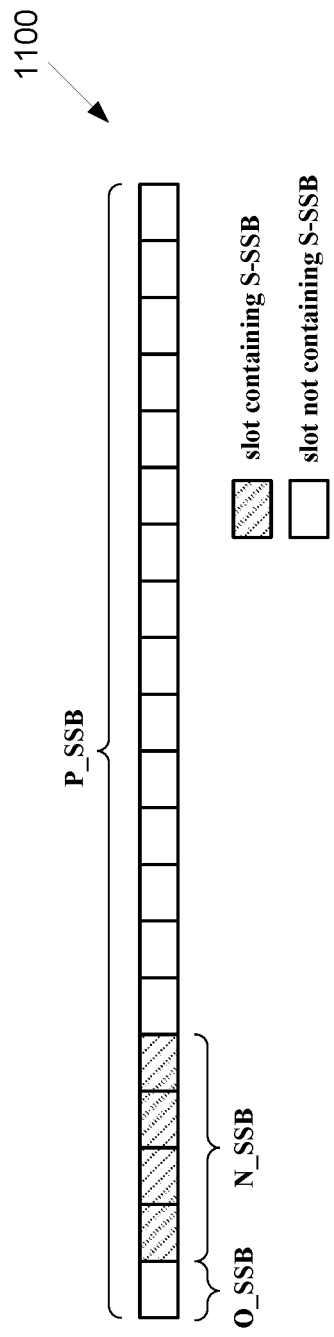
FIG. 11 illustrates an example transmission pattern for S-SSB according to embodiments of the present disclosure.

FIG. 11 illustrates an example transmission pattern for S-SSB 1100 according to embodiments of the present disclosure. An embodiment of the transmission pattern for S-SSB 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

In one embodiment, the offset (e.g., denoted as O_SSB) for the transmission of S-SSBs within a S-SSB period (e.g., denoted as P_SSB) can be fixed. For example, the offset is fixed as 0 slot, such that the sidelink UE always assumes the transmission of the burst of N_SSB S-SSBs starts from the first slot of the period.

In another embodiment, the offset (e.g., denoted as O_SSB) for the transmission of S-SSBs within a S-SSB period (e.g., denoted as P_SSB) can be configurable or pre-configured. For one example, the (pre-)configuration of the offset is associated with the (pre-)configuration of the number of transmitted S-SSBs. For another example, the configuration of the offset is indicated in the payload of PSBCH. For yet another example, the configuration of the offset is indicated by the combination of DMRS sequence of PSBCH and the payload of PSBCH.

In another embodiment, the transmission of N_SSB number of S-SSBs is evenly distributed in time domain within a S-SSB period with the same interval, wherein each S-SSB has a separate transmission burst and the distance between slots containing two neighboring S-SSBs is D_SSB, which is in the unit of slot and only applicable when N_SSB>1.

In one example, D_SSB is fixed with a value from 1≤D_SSB≤P_SSB/N_SSB.

In another example, D_SSB is configurable or pre-configured. For instance, one value (pre-)configured from 1≤D_SSB≤P_SSB/N_SSB.

In one example, the UE assumes the S-SSBs within a S-SSB period are transmitted in slots O_SSB+I_SSB*D_SSB, wherein I_SSB is the index of S-SSB within the configured number N_SSB of S-SSBs in the period, with 0≤I_SSB≤N_SSB−1.

Figure 12:
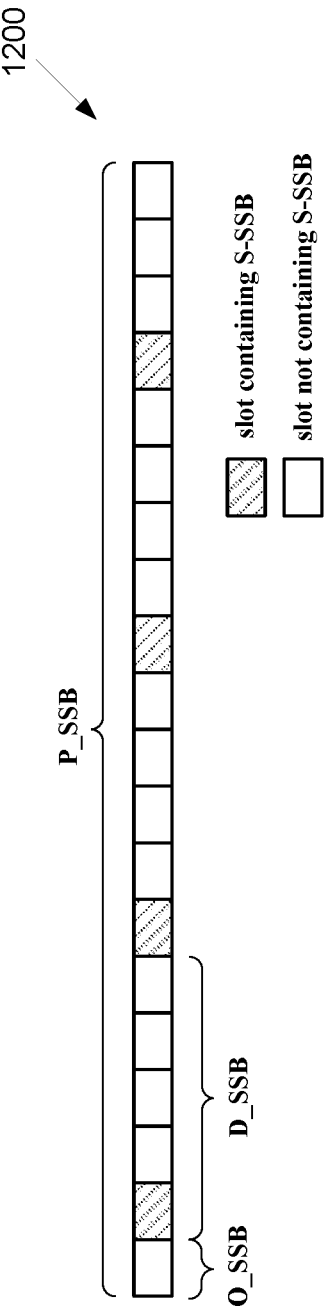
FIG. 12 illustrates another example transmission pattern for S-SSB according to embodiments of the present disclosure.

FIG. 12 illustrates another example transmission pattern for S-SSB 1200 according to embodiments of the present disclosure. An embodiment of the transmission pattern for S-SSB 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

In one example, the offset (e.g., denoted as O_SSB) for the transmission of S-SSBs within a S-SSB period (e.g., denoted as P_SSB) can be fixed. For example, the offset is fixed as 0 slot, such that the sidelink UE always assumes the transmission of the burst of N_SSB S-SSBs starts from the first slot of the S-SSB period.

In another example, the offset (e.g., denoted as O_SSB) for the transmission of S-SSBs within a S-SSB period (e.g., denoted as P_SSB) can be configurable or pre-configured. The offset denotes the slot offset between the slot including the first S-SSB in the period and the first slot in the period, where the first slot in the period is defined as the first slot of frame whose SFN/DFN satisfying SFN mod (P_SSB/10)=0, wherein P_SSB is the default periodicity of S-SSB with a unit of ms. For one example, the (pre-)configuration of the offset is associated with the (pre-) configuration of the number of transmitted S-SSBs.

In yet another example, the configuration of the offset is indicated in the payload of PSBCH. For yet another example, the configuration of the offset is indicated by the combination of DMRS sequence of PSBCH and the payload of PSBCH.

In yet another example, the range of values for O_SSB can be determined as $\{0, \ldots, P\_SSB/N\_SSB-1\}$.

In yet another example, the transmission of a group within the N_SSB number of S-SSBs is uniformly distributed in time domain within a S-SSB period, wherein each group of S-SSBs (e.g., with a group size of G_SSB) has a separate transmission burst and the distance between the start of transmission of two neighboring groups of S-SSBs is P_SSB/G_SSB.

In yet another example, the range of values for O_SSB can be determined as $\{0, \ldots, P\_SSB/G\_SSB-1\}$.

Figure 13:
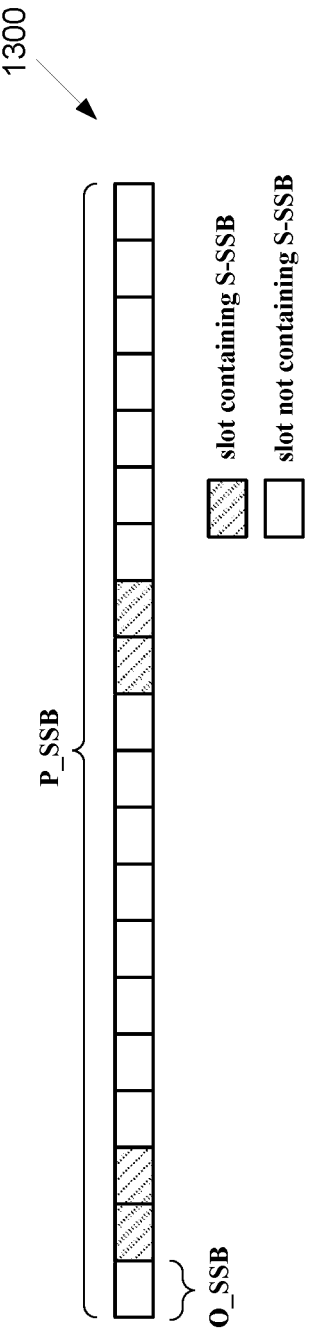
FIG. 13 illustrates yet another example transmission pattern for S-SSB according to embodiments of the present disclosure.

FIG. 13 illustrates yet another example transmission pattern for S-SSB 1300 according to embodiments of the present disclosure. An embodiment of the transmission pattern for S-SSB 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

In one example, the offset (e.g., denoted as O_SSB) for the transmission of S-SSBs within a S-SSB period (e.g., denoted as P_SSB) can be fixed. For example, the offset is fixed as 0 slot, such that the sidelink UE always assumes the transmission of the burst of N_SSB S-SSBs starts from the first slot of the S-SSB period.

In another example, the offset (e.g., denoted as O_SSB) for the transmission of S-SSBs within a S-SSB period (e.g., denoted as P_SSB) can be configurable or pre-configured. For one example, the (pre-)configuration of the offset is associated with the (pre-)configuration of the number of transmitted S-SSBs. For another example, the configuration of the offset is indicated in the payload of PSBCH. For yet another example, the configuration of the offset is indicated by the combination of DMRS sequence of PSBCH and the payload of PSBCH.

In yet another example, the group size (e.g., G_SSB) can be dividable by N_SSB, and value of G_SSB can be configurable or pre-configured. For one example, the (pre-)configuration of the group size is associated with the (pre-)configuration of the number of transmitted S-SSBs. For another example, the configuration of the group size is indicated in the payload of PSBCH. For yet another example, the configuration of the group size is indicated by the combination of DMRS sequence of PSBCH and the payload of PSBCH.

In yet another example, the transmission of the N_SSB number of S-SSBs is confined within a window (e.g., denoted as W_SSB) within a S-SSB period.

Figure 14:
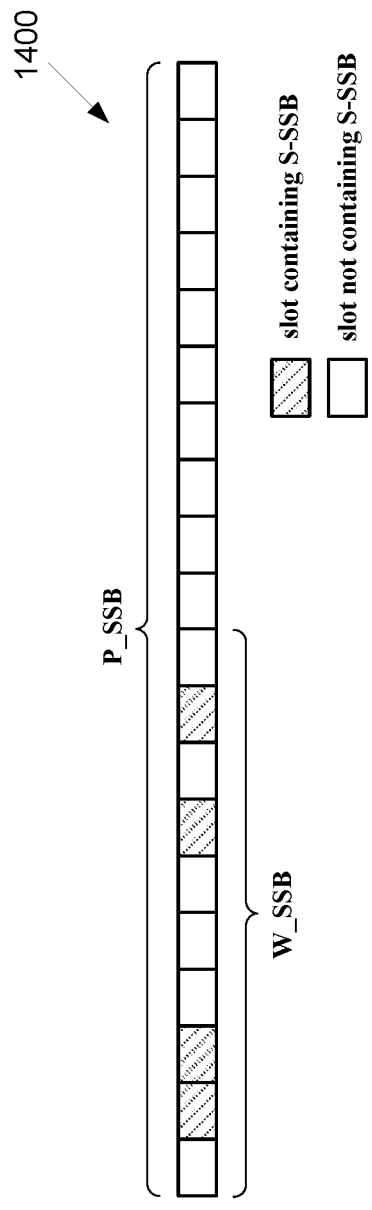
FIG. 14 illustrates yet another example transmission pattern for S-SSB according to embodiments of the present disclosure.

FIG. 14 illustrates yet another example transmission pattern for S-SSB 1400 according to embodiments of the present disclosure. An embodiment of the transmission pattern for S-SSB 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

In one example, the window (e.g., denoted as W_SSB) for the transmission of S-SSBs within a S-SSB period (e.g., denoted as P_SSB) can be fixed. For example, the window has a fixed window offset (e.g., 0 slot) and a fixed window duration (e.g., 10 ms).

In another example, the duration of the window (e.g., denoted as W_SSB) for the transmission of S-SSBs within a S-SSB period (e.g., denoted as P_SSB) can be scalable with the number of transmitted S-SSBs. For example, the window has a fixed window offset (e.g., 0 slot) and a scalable window duration with respect to the number of transmitted S-SSBs (e.g., if the number of transmitted S-SSBs doubled, the window duration also doubled).

In yet another example, the duration of the window (e.g., denoted as W_SSB) for the transmission of S-SSBs within a S-SSB period (e.g., denoted as P_SSB) can be (pre-)configurable. For one example, the (pre-)configuration of the duration of the window is associated with the (pre-) configuration of the number of transmitted S-SSBs. For another example, the configuration of the duration of the window is indicated in the payload of PSBCH. For yet another example, the configuration of the duration of the window is indicated by the combination of DMRS sequence of PSBCH and the payload of PSBCH.

In yet another example, the transmission of the S-SSBs within the window is (pre-) configured and indicated by a bitmap. For one example, the (pre-)configuration of the bitmap is associated with the (pre-)configuration of the number of transmitted S-SSBs. For another example, the configuration of the bitmap is indicated in the payload of PSBCH. For yet another example, the configuration of the bitmap is indicated by the combination of DMRS sequence of PSBCH and the payload of PSBCH. For yet another example, the bit-width of the bitmap equals the number of slots in the window for the transmission of S-SSBs.

In yet another example, the transmission of the N_SSB number of S-SSBs is confined within at least one window within a S-SSB period.

Figure 15:
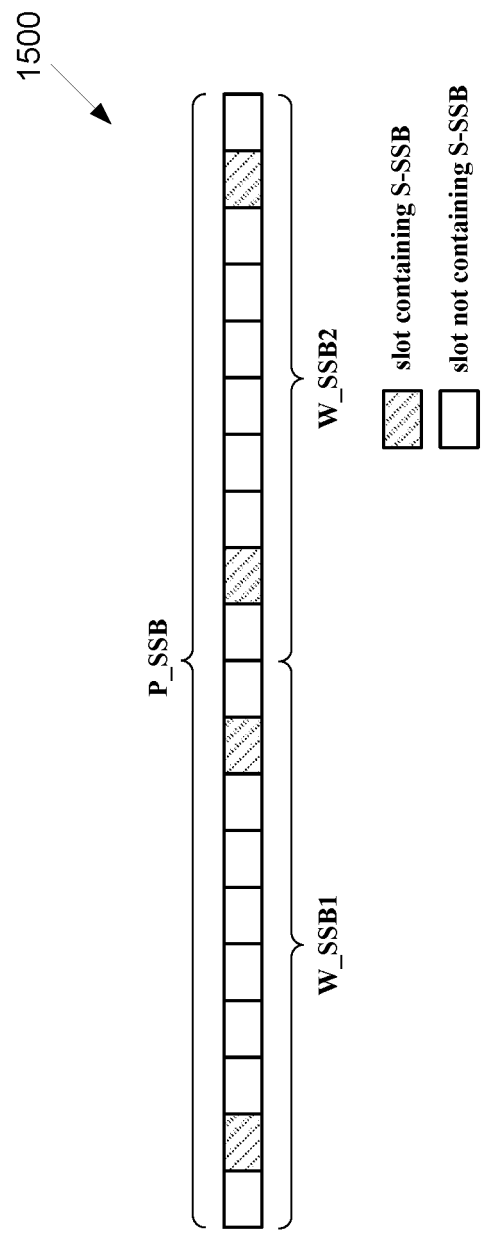
FIG. 15 illustrates yet another example transmission pattern for S-SSB according to embodiments of the present disclosure.

FIG. 15 illustrates yet another example transmission pattern for S-SSB 1500 according to embodiments of the present disclosure. An embodiment of the transmission pattern for S-SSB 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

In one example, the number of windows for the transmission of S-SSBs within a S-SSB period can be fixed.

In another example, the number of the windows for the transmission of S-SSBs within a S-SSB period (e.g., denoted as P_SSB) can be (pre)-configurable. For one example, the (pre-) configuration of the number of the windows is associated with the (pre-)configuration of the number of transmitted S-SSBs. For another example, the configuration of the number of the windows is indicated in the payload of PSBCH. For yet another example, the configuration of the number of the windows is indicated by the combination of DMRS sequence of PSBCH and the payload of PSBCH.

In yet another example, the transmission of the S-SSBs within a window is (pre-) configured and indicated by a bitmap. For one example, the (pre-)configuration of the bitmap is associated with the (pre-)configuration of the number of transmitted S-SSBs in a window. For another example, the configuration of the bitmap is indicated in the payload of PSBCH. For yet another example, the configuration of the bitmap is indicated by the combination of DMRS sequence of PSBCH and the payload of PSBCH. For yet another example, the bit-width of the bitmap equals the number of slots in the window for the transmission of S-SSBs.

Example (pre-)configurations for the transmission of S-SSB are according to the embodiments and examples covered in this disclosure.

In one example, the (pre-)configuration for the transmission of S-SSBs includes a number of transmitted S-SSBs (e.g., N_SSB), and a number of groups for the transmission of S-SSBs (e.g., G_SSB), wherein N_SSB is an integer multiple of G_SSB. For instance, N_SSB=$2^n$, and G_SSB=$2^g$, wherein $0 \leq g \leq n$. The period for S-SSB transmission (e.g., P_SSB) can be divided into G_SSB groups, wherein each group has a duration of P_SSB/G_SSB, and there are N_SSB/G_SSB S-SSBs transmitted in each of the group. In one example, the transmission locations of the S-SSBs are the same for all the groups within the corresponding divided duration, e.g., consecutive from the beginning of the divided duration.

In one sub-example, G_SSB, can be (pre-)configured as any value with the form G_SSB=$2^g$, wherein $0 \leq g \leq n$. In another sub-example, G_SSB, can be (pre-)configured as a value with the form G_SSB=$2^g$, wherein $0 \leq g \leq \min(n, k)$, and k is a predefined value (e.g., k=2 or k=3). In one example, the configurability of the number of groups (e.g., G_SSB) is equivalent to the configurability of the number of S-SSBs in a group (e.g., N_SSB/G_SSB), for a given number of transmitted S-SSBs (e.g., N_SSB).

Figure 16:
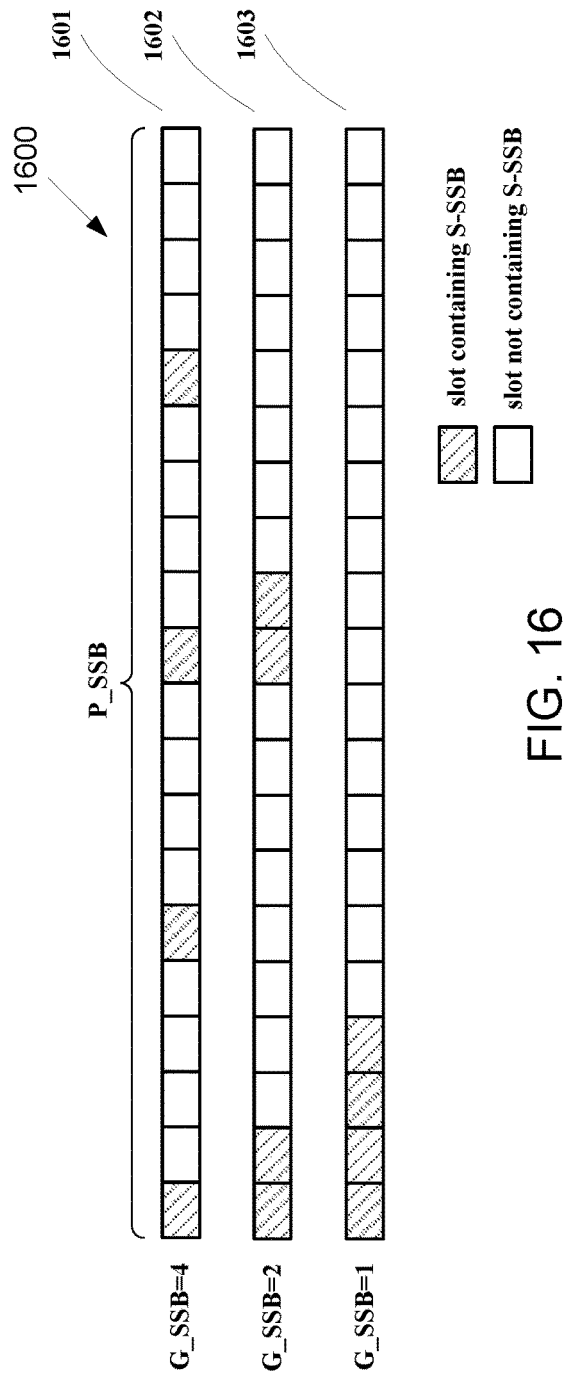
FIG. 16 illustrates an example configuration for S-SSB transmission according to embodiments of the present disclosure.

FIG. 16 illustrates an example configuration for S-SSB transmission 1600 according to embodiments of the present disclosure. An embodiment of the configuration for S-SSB transmission 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

An illustration of the example (pre-)configuration of transmission for S-SSB is shown in FIG. 16, wherein the group number (e.g., G_SSB) can be (pre-)configured as one from 1 (1603 in FIG. 16), 2 (1602 in FIG. 16), and 4 (1601 in FIG. 16), with the number of transmitted S-SSB (e.g., N_SSB) as 4.

In another example, the (pre-)configuration for the transmission of S-SSBs includes a number of transmitted S-SSBs (e.g., N_SSB), a number of groups for the transmission of S-SSBs (e.g., G_SSB), and an offset within the group of S-SSBs (e.g., O_SSB), wherein N_SSB is an integer multiple of G_SSB. For instance, N_SSB=$2^n$, and G_SSB=$2^g$, wherein $0 \leq g \leq n$. The period for S-SSB transmission (e.g., P_SSB) can be divided into G_SSB groups, wherein each group has a duration of P_SSB/G_SSB, and there are N_SSB/G_SSB S-SSBs transmitted in each of the group with an offset O_SSB. In one example, the transmission locations of the S-SSBs are the same for all the groups within the corresponding divided duration, e.g., consecutive from the beginning of the divided duration with an offset O_SSB. In one sub-example, G_SSB can be (pre-) configured as any value with the form G_SSB=$2^g$, wherein $0 \leq g \leq n$.

In another sub-example, G_SSB can be (pre-)configured as a value with the form G_SSB=$2^g$, wherein $0 \leq g \leq \min(n, k)$, and k is a predefined value (e.g., k=2 or k=3). In one example, the configurability of the number of groups (e.g., G_SSB) is equivalent to the configurability of the number of S-SSBs in a group (e.g., N_SSB/G_SSB), for a given number of transmitted S-SSBs (e.g., N_SSB).

Figure 17:
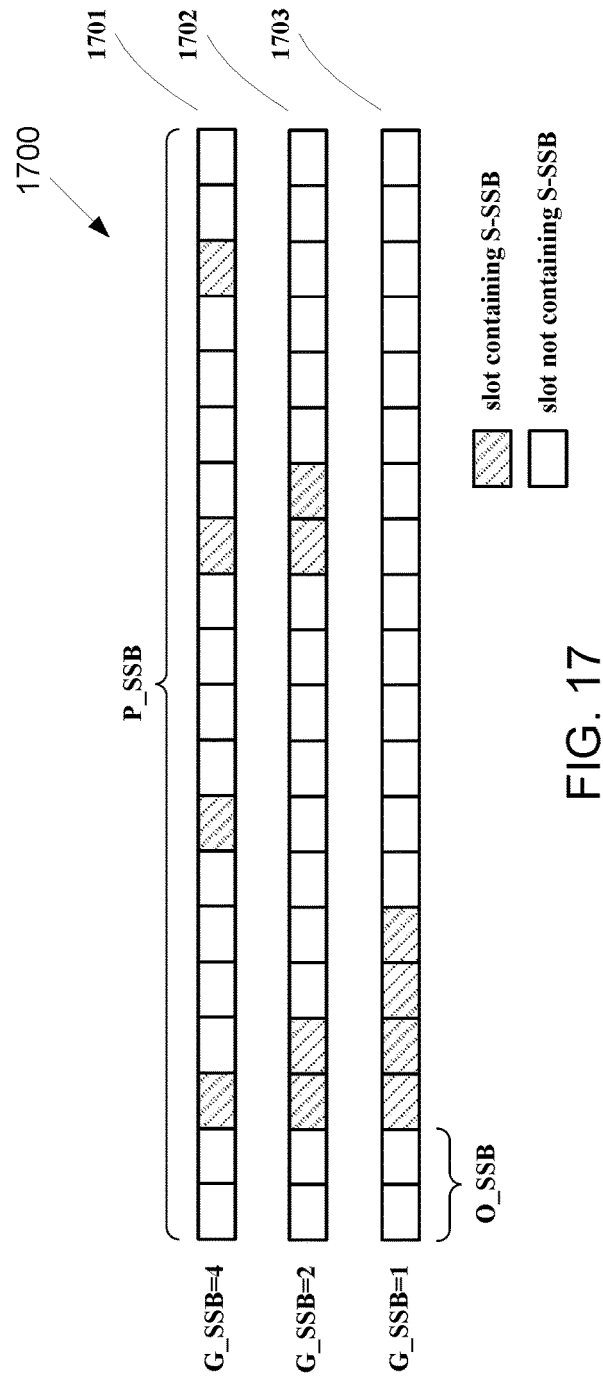
FIG. 17 illustrates another example configuration for S-SSB transmission according to embodiments of the present disclosure.

FIG. 17 illustrates another example configuration for S-SSB transmission 1700 according to embodiments of the present disclosure. An embodiment of the configuration for S-SSB transmission 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

An illustration of the example (pre-)configuration of transmission for S-SSB is shown in FIG. 17, wherein the group number (e.g., G_SSB) can be (pre-)configured as one from 1 (1703 in FIG. 17), 2 (1702 in FIG. 17), or 4 (1701 in FIG. 17), with the number of transmitted S-SSB (e.g., N_SSB) as 4.

In one embodiment, there can be QCL assumption among S-SSB (e.g., the SSS and/or DMRS of PSBCH in the S-SSB) in different S-SSB periods, and S-SSBs with the same relative slot index within the S-SSB period (e.g., same slot index in a frame and same 1st, 2nd, 3rd, and 4th LSB of DFN/SFN if periodicity is 160 ms) or with the same S-SSB index (e.g., a S-SSB index is defined as relative index within the number of transmitted S-SSBs) are QCLed.

In one example, in addition to the QCL assumption across S-SSB periods, there can be extra QCL assumption among S-SSBs within the same S-SSB period. At least one of the following embodiments and/or examples of embodiment can be supported and can be (pre-)configurable among the supported embodiment and/or examples of embodiment if more than one embodiment and/or more than one example are supported.

In one embodiment, there can be no QCL assumption among S-SSBs in the same S-SSB period.

In another embodiment, there can be a fixed QCL assumption among S-SSBs in the same S-SSB period. For example, all the S-SSBs in the same S-SSB period are assumed to be QCLed, regardless of the transmission pattern of the S-SSBs.

In yet another embodiment, the QCL assumption can be associated with the transmission pattern.

Figure 18:
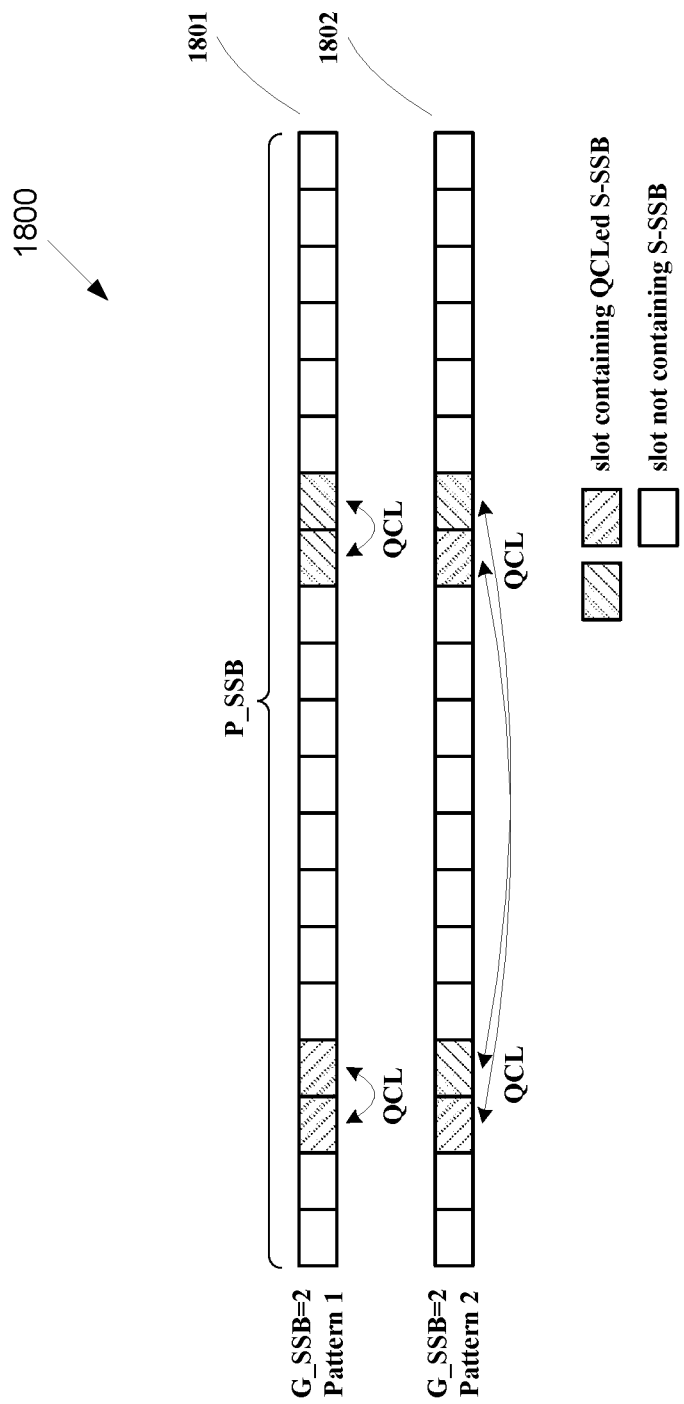
FIG. 18 illustrates an example QCL assumption associated with the (pre-) configuration of transmission for S-SSB according to embodiments of the present disclosure.

FIG. 18 illustrates an example QCL assumption associated with the (pre-) configuration of transmission for S-SSB 1800 according to embodiments of QCL assumption associated with the (pre-) configuration of transmission for S-SSB 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

In one example, when the transmission of S-SSBs are divided into at least one group within a S-SSB period (e.g., at least one burst of transmission), S-SSBs within a group are assumed to be QCLed (e.g., denoted as QCL assumption Pattern 1). An illustration of the example QCL assumption associated with the (pre-)configuration of transmission for S-SSB is shown in 1801 of FIG. 18, wherein the number of groups of transmitted S-SSBs is 2 (e.g., G_SSB=2), and the number of transmitted S-SSBs is 4 (e.g., N_SSB=4).

In one example, when the transmission of S-SSBs are divided into at least one group within a S-SSB period (e.g., at least one burst of transmission), S-SSBs in different groups and with same relative index within the group are assumed to be QCLed (e.g., denoted as QCL assumption Pattern 2). An illustration of the example QCL assumption associated with the (pre-) configuration of transmission for S-SSB is shown in 1802 of FIG. 18, wherein the number of groups of transmitted S-SSBs is 2 (e.g., G_SSB=2), and the number of transmitted S-SSBs is 4 (e.g., N_SSB=4).

In yet another example, there is an indication of either of the above two example QCL assumptions, e.g., (pre-)configuration of the QCL assumption pattern of either S-SSBs within a group assumed to be QCLed (e.g., Pattern 1) or S-SSBs in different groups and with same relative index within the group assumed to be QCLed (e.g., Pattern 2). For example, (pre-)configuration of the QCL assumption of either 1801 (e.g., Pattern 1) or 1802 (e.g., Pattern 2) of FIG. 18, wherein the number of groups of transmitted S-SSBs is 2 (e.g., G_SSB=2), and the number of transmitted S-SSBs is 4 (e.g., N_SSB=4).

In yet another example, the QCL assumption can be (pre-)configured among no QCL assumption within a S-SSB period, QCL assumption Pattern 1, or QCL assumption Pattern 2.

In yet another example, the QCL assumption can be (pre-)configurable, e.g., separately from the possibly (pre-)configurable transmission pattern if supported. For example, there can be a parameter for QCL assumption derivation (pre-)configured, e.g., denoted as Q_SSB, wherein Q_SSB is dividable by N_SSB. For one instance, Q_SSB can be (pre-)configured and associated to the (pre-)configuration of the number of transmitted S-SSBs (e.g., N_SSB). For another instance, Q_SSB can be configured in the payload of PSBCH. In one example, the (pre-) configurability of Q_SSB is the equivalent as the (pre-)configurability of N_SSB/Q_SSB, for a given N_SSB.

Figure 19:
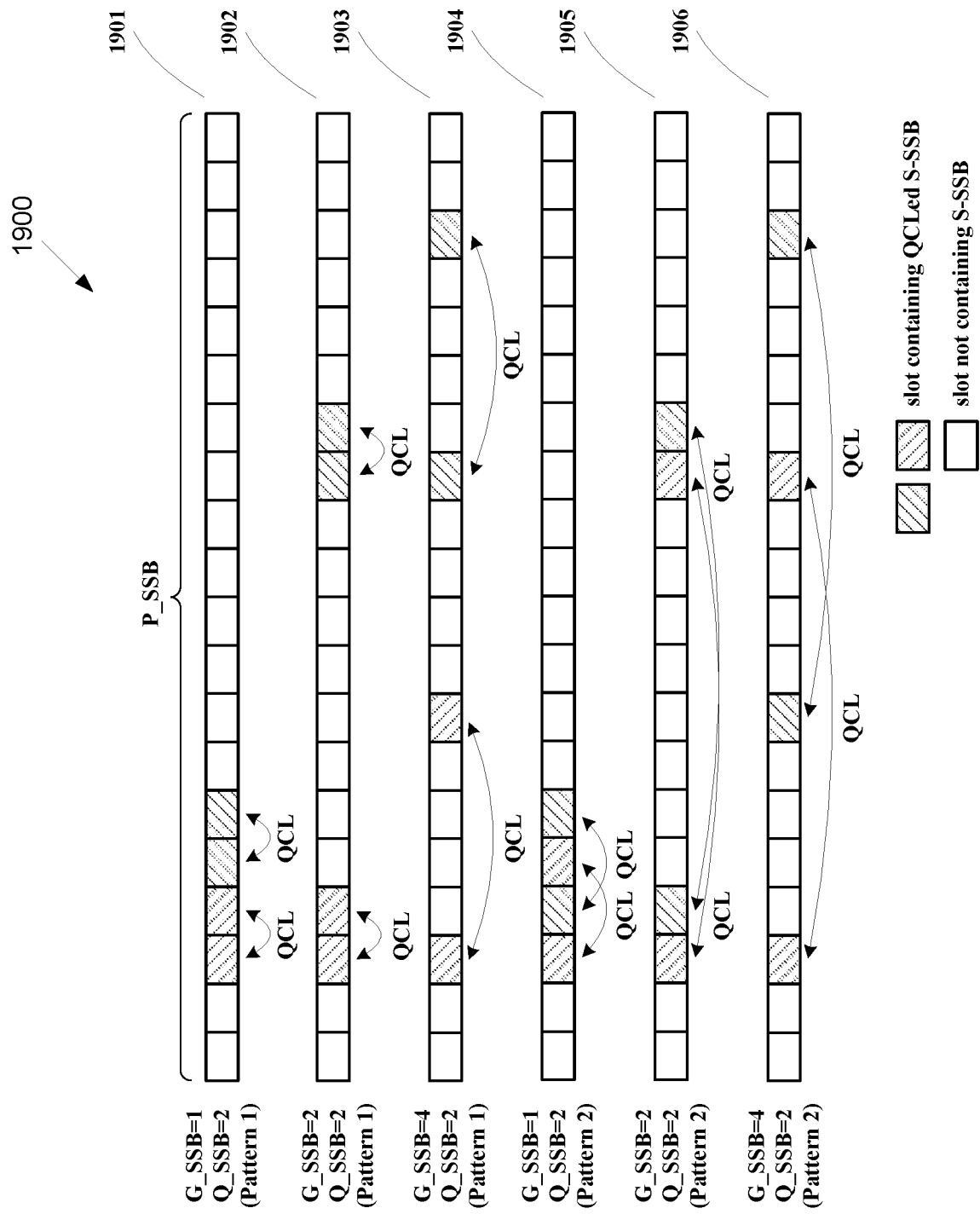
FIG. 19 illustrates an example (pre-)configurable QCL assumption for transmitted S-SSB according to embodiments of the present disclosure.

FIG. 19 illustrates an example (pre-)configurable QCL assumption for transmitted S-SSB 1900 according to embodiments of the present disclosure. An embodiment of the (pre-) configurable QCL assumption for transmitted S-SSB 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

In one example, denote the relative index of S-SSB within the N_SSB number of transmitted S-SSBs as i_SSB (e.g., defined as S-SSB index), wherein $0 \leq i\_SSB \leq N\_SSB-1$, then S-SSBs within the N_SSB number of transmitted S-SSBs are assumed to be QCLed, if floor(i_SSB/Q_SSB) of the S-SSBs are the same, wherein "floor(X)" is the floor operating as the largest integer smaller than or equal to X. This example can be denoted as QCL assumption Pattern 1. An illustration of the example (pre-)configurable QCL assumption for transmitted S-SSB is shown in 1901, 1902, and 1903 of FIG. 19, wherein the number of transmitted S-SSBs is 4 (e.g., N_SSB=4), and (pre-)configured QCL parameter is 2 (e.g., Q_SSB=2). In one example, there can be a further restriction that $N\_SSB/G\_SSB \geq Q\_SSB$.

In another example, denote the relative index of S-SSB within the N_SSB number of transmitted S-SSBs as i_SSB (e.g., defined as S-SSB index), wherein $0 \leq i\_SSB \leq N\_SSB-1$, then S-SSBs within the N_SSB number of transmitted S-SSBs are assumed to be QCLed, if i_SSB mod Q_SSB of the S-SSBs are the same, wherein "mod" refers to the modulo operation. This example can be denoted as QCL assumption Pattern 2. An illustration of the example (pre-)configurable QCL assumption for transmitted S-SSB is shown in 1904, 1905, and 1906 of FIG. 19, wherein the number of transmitted S-SSBs is 4 (e.g., N_SSB=4), and (pre-)configured QCL parameter is 2 (e.g., Q_SSB=2). In one example, there can be a further restriction that $G\_SSB \geq Q\_SSB$.

In yet another example, there can be a (pre-)configuration of either QCL assumption Pattern 1 or Pattern 2.

In yet another example, the QCL assumption can be (pre-)configured among no QCL assumption within a S-SSB period, QCL assumption Pattern 1, or QCL assumption Pattern 2.

In yet another example, the QCL assumption can be associated with the window supported for the transmission of S-SSBs.

Figure 20:
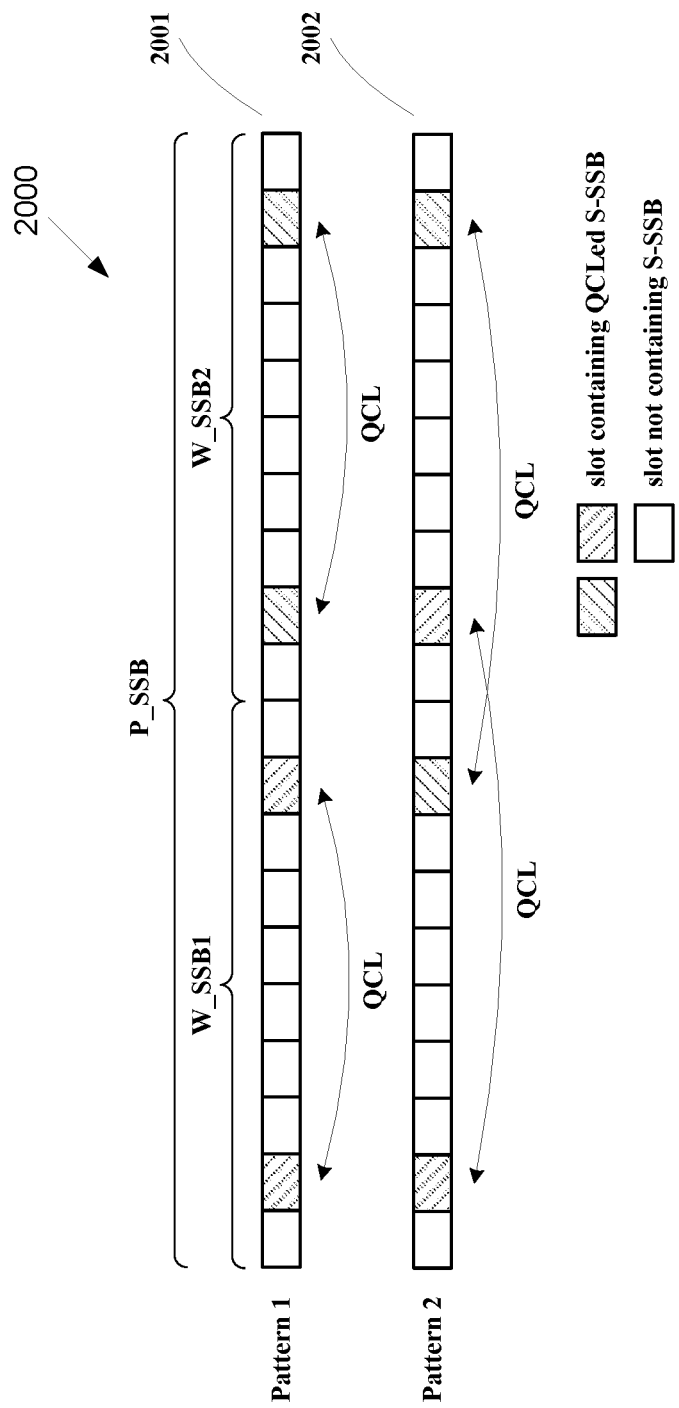
FIG. 20 illustrates an example QCL assumption associated with window(s) for transmission of S-SSBs according to embodiments of the present disclosure.

FIG. 20 illustrates an example QCL assumption associated with window(s) for transmission of S-SSBs 2000 according to embodiments of the present disclosure. An embodiment of the QCL assumption associated with window(s) for transmission of S-SSBs 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

In one example, the S-SSBs in the same window for transmission of S-SSBs are assumed to be QCLed. This example can be denoted as QCL assumption Pattern 1. An illustration of the example (pre-)configurable QCL assumption for transmitted S-SSB is shown in 2001 of FIG. 20, wherein the number of transmitted S-SSBs is 4 (e.g., N_SSB=4), and the number of windows for transmission of S-SSBs is 2.

In another example, the S-SSBs with same relative index within the window for transmission of S-SSBs and in different windows for transmission of S-SSBs are assumed to be QCLed. This example can be denoted as QCL assumption Pattern 2. An illustration of the example (pre-)configurable QCL assumption for transmitted S-SSB is shown in 2002 of FIG. 20, wherein the number of transmitted S-SSBs is 4 (e.g., N_SSB=4), and the number of windows for transmission of S-SSBs is 2.

In yet another example, the QCL assumption can be (pre-)configured between Pattern 1 or Pattern 2.

In yet another example, the QCL assumption can be (pre-)configured among no QCL assumption within a S-SSB period, QCL assumption Pattern 1, or QCL assumption Pattern 2.

In one embodiment, the time domain duration for the transmission of S-SSBs with respect to different supported SCS maintains the same. For one example of frequency range 1 (FR1), the time domain duration for a slot with respect to 15 kHz SCS containing a S-SSB corresponds to 2 consecutive slots with respect to 30 kHz SCS containing S-SSBs, and 4 consecutive slots with respect to 60 kHz SCS containing S-SSBs. For one example of FR2, the time domain duration for a slot with respect to 60 kHz SCS containing a S-SSB corresponds to 2 consecutive slots with respect to 120 kHz SCS containing S-SSBs.

Figure 21:
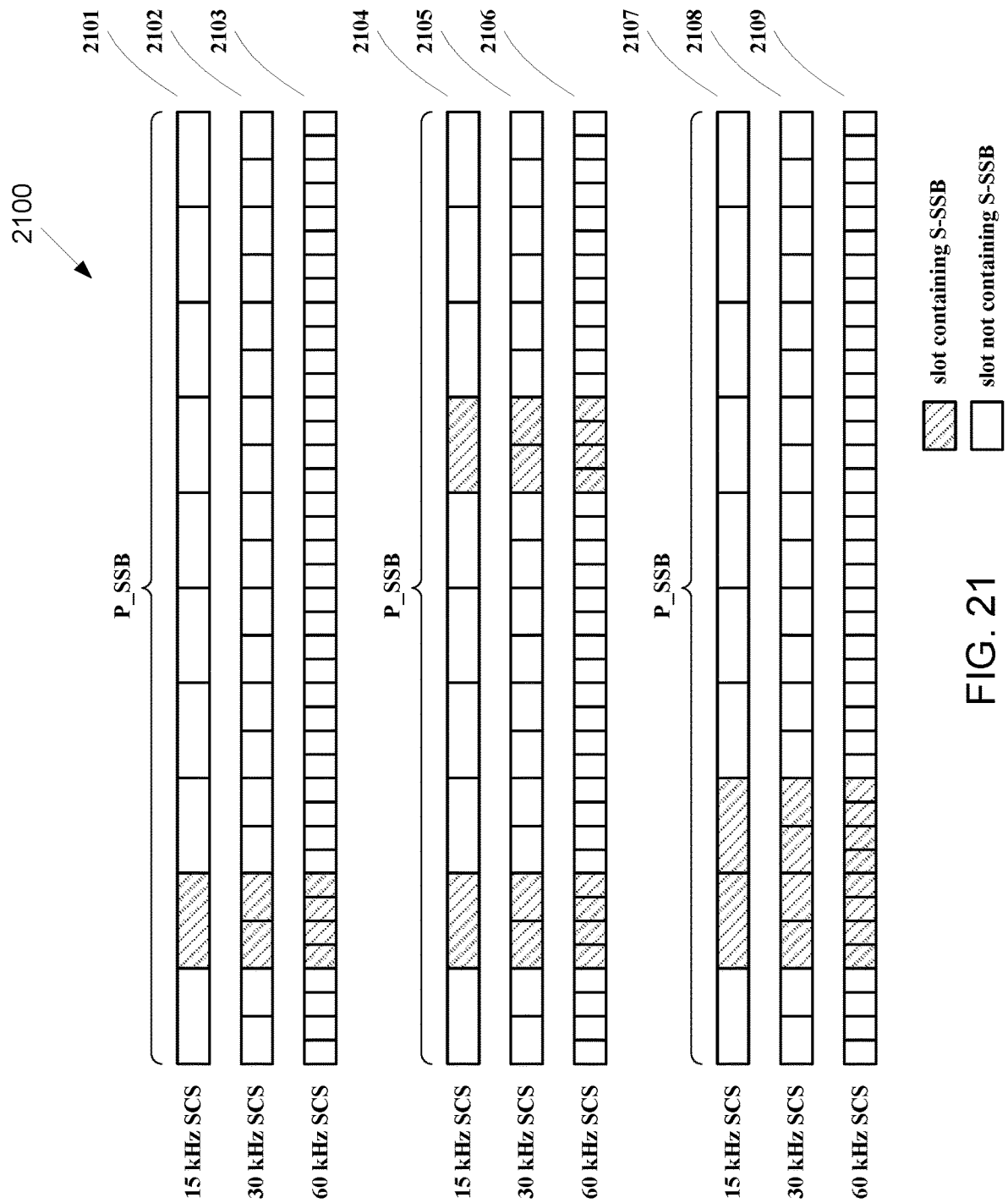
FIG. 21 illustrates an example transmission of S-SSBs with respect to SCS according to embodiments of the present disclosure.

FIG. 21 illustrates an example transmission of S-SSBs with respect to SCS 2100 according to embodiments of the present disclosure. An embodiment of the transmission of S-SSBs with respect to SCS 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

An illustration of the example scaling transmission with respect to SCS is shown in FIGS. 21. 2101, 2102, and 2103 show transmission of 1, 2, and 4 S-SSBs with respect to 15 kHz, 30 kHz, and 60 kHz, correspondingly, wherein the transmission for all SCSs occupies the same time domain duration. 2104, 2105, and 2106 show transmission of 2, 4, and 8 S-SSBs with respect to 15 kHz, 30 kHz, and 60 kHz, correspondingly, wherein the transmission is divided into 2 bursts (e.g., G_SSB=2) and each burst of transmission occupies the same time domain duration for all SCSs. 2107, 2108, and 2109 show transmission of 2, 4, and 8 S-SSBs with respect to 15 kHz, 30 kHz, and 60 kHz, correspondingly, wherein the transmission has single burst (e.g., G_SSB=1) and the transmission for all SCSs occupies the same time domain duration.

In one embodiment, after receiving a S-SSB from sidelink channels, detecting the synchronization signals, and decoding the payload of PSBCH, the sidelink UE can be able to acquire the timing information of the synchronization source from the (pre-)configuration about the transmission of S-SSBs and/or the information carried by the received S-SSB (e.g., synchronization signals, and/or DM-RS of PSBCH, and/or payload of PSBCH), wherein the timing information includes at least one of a frame timing, a slot timing, or a symbol timing.

In one example, the sidelink UE acquires the information of the slot offset for transmission of S-SSBs (e.g., denoted as O_SSB), the slot interval for transmission of S-SSBs (e.g., denoted as D_SSB), and the number of transmitted S-SSBs within a S-SSB period (e.g., denoted as N_SSB), from the (pre-)configuration about the transmission of S-SSBs, and then acquires a DFN/SFN containing the received S-SSB (e.g., denoted as SFN_SSB), and an index of slot within the DFN/SFN containing the received S-SSB (e.g., denoted as S_SSB), from signal and/or channel carrying such information in the received S-SSB (e.g., content of PSBCH in the received S-SSB), then for one instance, the UE assumes the index of received S-SSB (e.g., denoted as I_SSB) satisfies ((SFN_SSB*10*2^u+S_SSB) mod (P_SSB*2^u)=O_SSB+D_SSB*i_SSB, or for another instance, the UE could derive the index of S-SSB (e.g., denoted as I_SSB) as I_SSB=((SFN_SSB*10*2^u+S_SSB) mod (P_SSB*2^u)−O_SSB)/D_SSB, if N_SSB>1; and I_SSB=0 if N_SSB=1.

P_SSB is the default periodicity of S-SSB in the unit of ms (e.g., P_SSB=160 ms), and 2^u is the ratio of SCS of S-SSB comparing to 15 kHz (e.g., 2^u=1, 2, 4, and 8, for SCS of S-SSB as 15 kHz, 30 kHz, 60 kHz, and 120 kHz, respectively). In one example, the UE expects the derived index of S-SSB being an integer and satisfying 0≤I_SSB≤N_SSB−1. In another example, the UE expects the burst of S-SSBs is within a period of duration P_SSB, e.g., O_SSB+D_SSB*(N_SSB−1)≤P_SSB*2^u−1.

In another example, the sidelink UE acquires the information of the slot offset for transmission of S-SSBs (e.g., denoted as O_SSB), the slot interval for transmission of S-SSBs (e.g., denoted as D_SSB), and the number of transmitted S-SSBs within a S-SSB period (e.g., denoted as N_SSB), from the (pre-)configuration about the transmission of S-SSBs, and then acquires a DFN/SFN containing the received S-SSB (e.g., denoted as SFN_SSB), and an index of slot within the DFN/SFN containing the received S-SSB (e.g., denoted as S_SSB), from signal and/or channel carrying such information in the received S-SSB (e.g., content of PSBCH in the received S-SSB), then the UE could derive the index of S-SSB (e.g., denoted as I_SSB) as I_SSB=(K_SSB−O_SSB)/D_SSB where K_SSB=((SFN_SSB*10*2^u+S_SSB) mod (P_SSB*2^u), and P_SSB is the default periodicity of S-SSB in the unit of ms (e.g., P_SSB=160 ms), and 2^u is the ratio of SCS of S-SSB comparing to 15 kHz (e.g., 2^u=1, 2, 4, and 8, for SCS of S-SSB as 15 kHz, 30 kHz, 60 kHz, and 120 kHz, respectively). The UE expects the derived index of S-SSB being an integer and satisfying 0≤I_SSB≤N_SSB−1.

In yet another example, the sidelink UE acquires the information of the offset for transmission of S-SSBs (e.g., denoted as O_SSB), the slot interval for transmission of S-SSBs (e.g., denoted as D_SSB), the index of the received S-SSB within the N_SSB transmitted S-SSBs (e.g., denoted as i_SSB, and 0≤i_SSB≤N_SSB−1), the a DFN/SFN containing the received S-SSB (e.g., denoted as SFN_SSB), and an index of slot containing the received S-SSB (e.g., denoted as S_SSB), from the (pre-)configuration about the transmission of S-SSBs and/or the information carried by the received S-SSB, then the UE assumes the synchronization resources are present in the DFN/SFN and slot satisfying ((SFN_SSB*10*2^u+S_SSB) mod (P_SSB*2^u)=O_SSB+D_SSB*i_SSB where P_SSB is the default periodicity of S-SSB (e.g., P_SSB=160 ms), and 2^u is the ratio of SCS of S-SSB comparing to 15 kHz (e.g., 2^u=1, 2, 4, and 8, for SCS of S-SSB as 15 kHz, 30 kHz, 60 kHz, and 120 kHz, respectively).

In yet another example, the sidelink UE acquires the information of the offset for transmission of S-SSBs (e.g., denoted as O_SSB), the number of groups for the transmission of S-SSBs (e.g., denoted as G_SSB), the a DFN/SFN containing the received S-SSB (e.g., denoted as SFN_SSB), and an index of slot containing the received S-SSB (e.g., denoted as S_SSB), from the (pre-)configuration about the transmission of S-SSBs and/or the information carried by the received S-SSB, then the UE assumes the synchronization resources are present in the DFN/SFN and slot satisfying ((SFN_SSB*10*2^u+S_SSB) mod (P_SSB*2^u/G_SSB)=O_SSB where P_SSB is the default periodicity of S-SSB (e.g., P_SSB=160 ms), and 2^u is the ratio of SCS of S-SSB comparing to 15 kHz (e.g., 2^u=1, 2, 4, and 8, for SCS of S-SSB as 15 kHz, 30 kHz, 60 kHz, and 120 kHz, respectively). In one example, the UE expects the burst of S-SSBs is within a period of duration P_SSB, e.g., O_SSB+D_SSB*(N_SSB−1)≤P_SSB*2^u−1.

In yet another example, the sidelink UE acquires the information of the offset for transmission of S-SSBs (e.g., denoted as O_SSB), the number of transmitted S-SSBs (e.g., denoted as N_SSB), the number of groups for the transmission of S-SSBs (e.g., denoted as G_SSB), the index of the received S-SSB within the N_SSB transmitted S-SSBs (e.g., denoted as i_SSB, and 0≤i_SSB≤N_SSB−1), the a DFN/SFN containing the received S-SSB (e.g., denoted as SFN_SSB), and an index of slot containing the received S-SSB (e.g., denoted as S_SSB), from the (pre-) configuration about the transmission of S-SSBs and/or the information carried by the received S-SSB, then the UE assumes the synchronization resources are present in the DFN/SFN and slot satisfying ((SFN_SSB*10*2^u+S_SSB) mod (P_SSB*2^u/G_SSB)=O_SSB+(i_SSB mod (N_SSB/G_SSB)) where P_SSB is the default periodicity of S-SSB (e.g., P_SSB=160 ms), and 2^u is the ratio of SCS of S-SSB comparing to 15 kHz (e.g., 2^u=1, 2, 4, and 8, for SCS of S-SSB as 15 kHz, 30 kHz, 60 kHz, and 120 kHz, respectively).

In yet another example, the sidelink UE acquires the information of the offset for transmission of S-SSBs (e.g., denoted as O_SSB), the number of transmitted S-SSBs (e.g., denoted as N_SSB), the number of groups for the transmission of S-SSBs (e.g., denoted as G_SSB), the index of the received S-SSB within the group of (N_SSB/G_SSB) transmitted S-SSBs (e.g., denoted as i_SSB, and 0≤i_SSB≤N_SSB/G_SSB−1), the a DFN/SFN containing the received S-SSB (e.g., denoted as SFN_SSB), and an index of slot containing the received S-SSB (e.g., denoted as S_SSB), from the (pre-)configuration about the transmission of S-SSBs and/or the information carried by the received S-SSB, then the UE assumes the synchronization resources are present in the DFN/SFN and slot satisfying ((SFN_SSB*10*2^u+S_SSB) mod (P_SSB*2^u/G_SSB)=O_SSB+i_SSB where P_SSB is the default periodicity of S-SSB (e.g., P_SSB=160 ms), and 2^u is the ratio of SCS of S-SSB comparing to 15 kHz (e.g., 2^u=1, 2, 4, and 8, for SCS of S-SSB as 15 kHz, 30 kHz, 60 kHz, and 120 kHz, respectively).

In yet another example, the sidelink UE acquires the information of a DFN/SFN containing the received S-SSB (e.g., denoted as SFN_SSB), and an index of slot containing the received S-SSB (e.g., denoted as S_SSB), from the (pre-)configuration about the transmission of S-SSBs and/or the information carried by the received S-SSB, then the UE assumes the synchronization resources are present in the DFN/SFN and slot satisfying ((SFN_SSB*10*2^u+S_SSB) mod (P_SSB*2^u)=0 where P_SSB is the default periodicity of S-SSB (e.g., P_SSB=160 ms), and 2^u is the ratio of SCS of S-SSB comparing to 15 kHz (e.g., 2^u=1, 2, 4, and 8, for SCS of S-SSB as 15 kHz, 30 kHz, 60 kHz, and 120 kHz, respectively).

In yet another example, the sidelink UE acquires the information of the index of the received S-SSB within the N_SSB transmitted S-SSBs (e.g., denoted as i_SSB, and 0≤i_SSB≤N_SSB−1), the a DFN/SFN containing the received S-SSB (e.g., denoted as SFN_SSB), and an index of slot containing the received S-SSB (e.g., denoted as S_SSB), from the (pre-)configuration about the transmission of S-SSBs and/or the information carried by the received S-SSB, then the UE assumes the synchronization resources are present in the DFN/SFN and slot satisfying ((SFN_SSB*10*2^u+S_SSB) mod (P_SSB*2^u)=i_SSB where P_SSB is the default periodicity of S-SSB (e.g., P_SSB=160 ms), and 2^u is the ratio of SCS of S-SSB comparing to 15 kHz (e.g., 2^u=1, 2, 4, and 8, for SCS of S-SSB as 15 kHz, 30 kHz, 60 kHz, and 120 kHz, respectively).

In yet another example, the sidelink UE acquires the information of the number of groups for the transmission of S-SSBs (e.g., denoted as G_SSB), the a DFN/SFN containing the received S-SSB (e.g., denoted as SFN_SSB), and an index of slot containing the received S-SSB (e.g., denoted as S_SSB), from the (pre-)configuration about the transmission of S-SSBs and/or the information carried by the received S-SSB, then the UE assumes the synchronization resources are present in the DFN/SFN and slot satisfying ((SFN_SSB*10*2^u+S_SSB) mod (P_SSB*2^u/G_SSB)=0 where P_SSB is the default periodicity of S-SSB (e.g., P_SSB=160 ms), and 2^u is the ratio of SCS of S-SSB comparing to 15 kHz (e.g., 2^u=1, 2, 4, and 8, for SCS of S-SSB as 15 kHz, 30 kHz, 60 kHz, and 120 kHz, respectively).

In yet another example, the sidelink UE acquires the information of the number of transmitted S-SSBs (e.g., denoted as N_SSB), the number of groups for the transmission of S-SSBs (e.g., denoted as G_SSB), the index of the received S-SSB within the N_SSB transmitted S-SSBs (e.g., denoted as i_SSB, and 0≤i_SSB≤N_SSB−1), the a DFN/SFN containing the received S-SSB (e.g., denoted as SFN_SSB), and an index of slot containing the received S-SSB (e.g., denoted as S_SSB), from the (pre-)configuration about the transmission of S-SSBs and/or the information carried by the received S-SSB, then the UE assumes the synchronization resources are present in the DFN/SFN and slot satisfying ((SFN_SSB*10*2^u+S_SSB) mod (P_SSB*2^u/G_SSB)=(i_SSB mod (N_SSB/G_SSB)) where P_SSB is the default periodicity of S-SSB (e.g., P_SSB=160 ms), and 2^u is the ratio of SCS of S-SSB comparing to 15 kHz (e.g., 2^u=1, 2, 4, and 8, for SCS of S-SSB as 15 kHz, 30 kHz, 60 kHz, and 120 kHz, respectively).

In yet another example, the sidelink UE acquires the information of the number of transmitted S-SSBs (e.g., denoted as N_SSB), the number of groups for the transmission of S-SSBs (e.g., denoted as G_SSB), the index of the received S-SSB within the group of (N_SSB/G_SSB) transmitted S-SSBs (e.g., denoted as i_SSB, and 0≤i_SSB≤N_SSB/G_SSB−1), the a DFN/SFN containing the received S-SSB (e.g., denoted as SFN_SSB), and an index of slot containing the received S-SSB (e.g., denoted as S_SSB), from the (pre-)configuration about the transmission of S-SSBs and/or the information carried by the received S-SSB, then the UE assumes the synchronization resources are present in the DFN/SFN and slot satisfying ((SFN_SSB*10*2^u+S_SSB) mod (P_SSB*2^u/G_SSB)=i_SSB where P_SSB is the default periodicity of S-SSB (e.g., P_SSB=160 ms), and 2^u is the ratio of SCS of S-SSB comparing to 15 kHz (e.g., 2^u=1, 2, 4, and 8, for SCS of S-SSB as 15 kHz, 30 kHz, 60 kHz, and 120 kHz, respectively).

In one embodiment, the frequency domain information for S-SSB transmission is (pre-) configured to the UE.

In one example, the frequency position of one subcarrier of the S-SSB is (pre-) configured to the UE by a higher layer parameter.

In one example, the one subcarrier is the subcarrier with index 66 within the 132 subcarriers of S-SSB in frequency domain, where the index starts from 0, corresponding to the lowest subcarrier of the S-SSB.

In another example, the one subcarrier is the subcarrier with index 65 within the 132 subcarriers of S-SSB in frequency domain, where the index starts from 0, corresponding to the lowest subcarrier of the S-SSB.

In yet another example, the one subcarrier is the subcarrier with index 6 within the RB of index 5 of S-SSB in frequency domain, where the index of subcarrier in a RB starts from 0, and the index of RB in the 11 RB bandwidth of S-SSB starts from 0.

In yet another example, the one subcarrier is the subcarrier with index 5 within the RB of index 5 of S-SSB in frequency domain, where the index of subcarrier in a RB starts from 0, and the index of RB in the 11 RB bandwidth of S-SSB starts from 0.

In yet another example, the one subcarrier is the subcarrier with index 0 within the 132 subcarriers of S-SSB in frequency domain, where the index starts from 0, corresponding to the lowest subcarrier of the S-SSB.

In yet another example, the one subcarrier is the subcarrier with index 0 within the RB of index 0 of S-SSB in frequency domain, where the index of subcarrier in a RB starts from 0, and the index of RB in the 11 RB bandwidth of S-SSB starts from 0.

In one example, the UE assumes the subcarrier with index 0 of S-SSB is aligned with a subcarrier with index 0 in an RB of the sidelink BWP containing the S-SSB. In this example, the RB grid of S-SSB is assumed to be aligned with the RB grid of SL BWP.

In another example, the UE assumes the numerology of the S-SSB is the same as the numerology of SL BWP containing the S-SSB.

In yet another example, the UE assumes the BW of S-SSB is confined within the BW of SL BWP. For example, the subcarrier with index 0 and 131 of the S-SSB are both confined within the RBs associated with the SL BWP.

In one embodiment, the length-127 sequences generated for S-PSS and S-SSS respectively are mapped to subcarriers with the same indices within the S-SSB. For this embodiment, denote the S-PSS sequence as $d_{S\text{-}PSS}(0), \ldots, d_{S\text{-}PSS}(126)$, and denote the S-SSS sequence as $d_{S\text{-}SSS}(0), \ldots, d_{S\text{-}SSS}(126)$.

Figure 22:
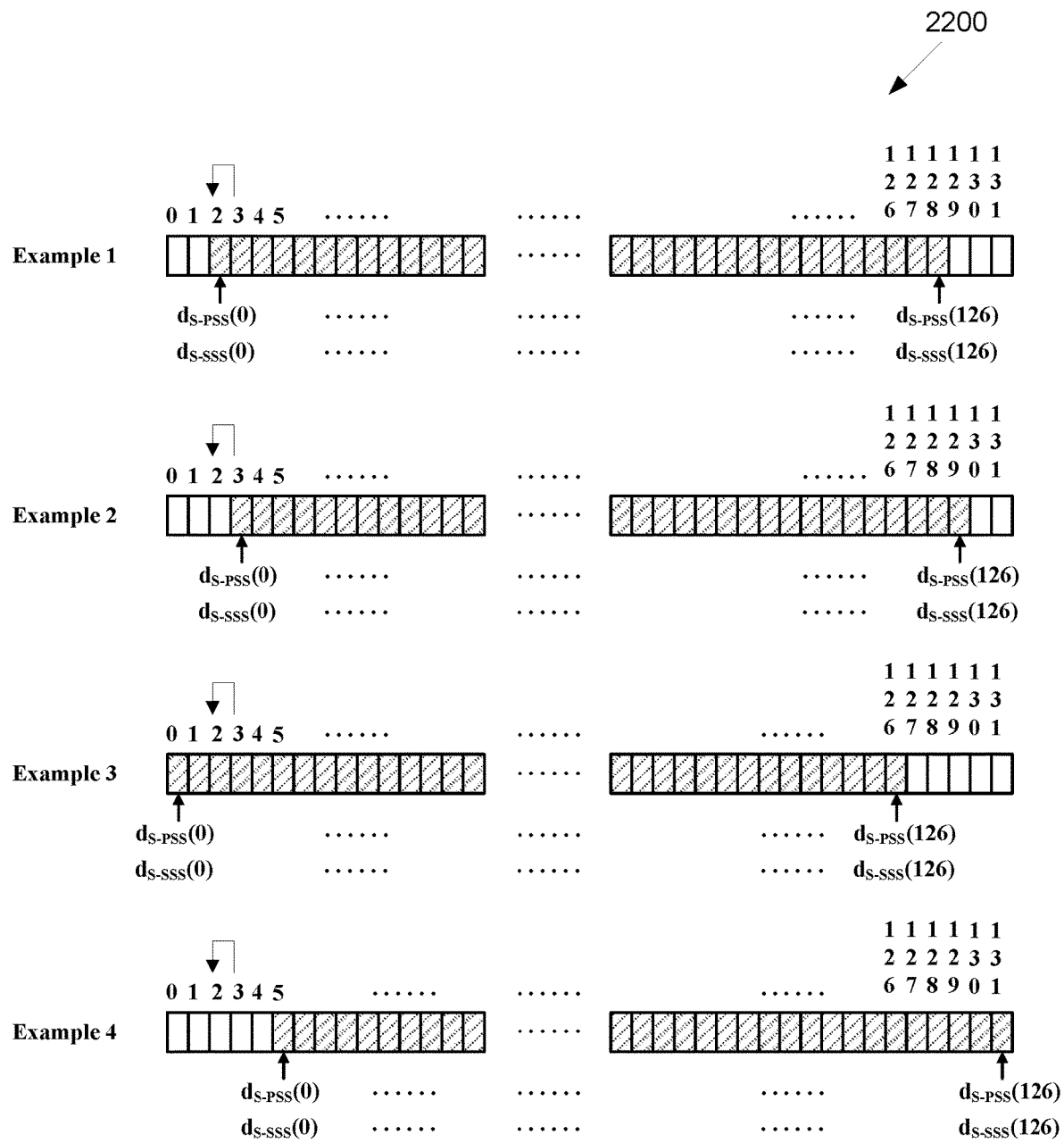
FIG. 22 illustrates an example sequence mapping in S-SSB according to embodiments of the present disclosure.

FIG. 22 illustrates an example sequence mapping in S-SSB 2200 according to embodiments of the present disclosure. An embodiment of the sequence mapping in S-SSB 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

In one example, the S-PSS sequence $d_{S\text{-}PSS}(0), \ldots, d_{S\text{-}PSS}(126)$ is mapped to the subcarrier with index from 2 to 128, respectively, and the S-SSS sequence $d_{S\text{-}SSS}(0), \ldots, d_{S\text{-}SSS}(126)$ is mapped to the subcarrier with index from 2 to 128, respectively, and the remaining subcarriers (i.e., with index 0, 1, 129, 130, 131) are set as 0, wherein the subcarrier index is within the 132 subcarriers for S-SSB. An illustration of this example is shown in Example 1 of FIG. 22.

In another example, the S-PSS sequence $d_{S\text{-}PSS}(0), \ldots, d_{S\text{-}PSS}(126)$ is mapped to the subcarrier with index from 3 to 129, respectively, and the S-SSS sequence $d_{S\text{-}SSS}(0), \ldots, d_{S\text{-}SSS}(126)$ is mapped to the subcarrier with index from 3 to 129, respectively, and the remaining subcarriers (i.e., with index 0, 1, 2, 130, 131) are set as 0, wherein the subcarrier index is within the 132 subcarriers for S-SSB. An illustration of this example is shown in Example 2 of FIG. 22.

In yet another example, the S-PSS sequence $d_{S\text{-}PSS}(0), \ldots, d_{S\text{-}PSS}(126)$ is mapped to the subcarrier with index from 0 to 126, respectively, and the S-SSS sequence $d_{S\text{-}SSS}(0), \ldots, d_{S\text{-}SSS}(126)$ is mapped to the subcarrier with index from 0 to 126, respectively, and the remaining subcarriers (i.e., with index 127, 128, 129, 130, 131) are set as 0, wherein the subcarrier index is within the 132 subcarriers for S-SSB. An illustration of this example is shown in Example 3 of FIG. 22.

In yet another example, the S-PSS sequence $d_{S\text{-}PSS}(0), \ldots, d_{S\text{-}PSS}(126)$ is mapped to the subcarrier with index from 5 to 131, respectively, and the S-SSS sequence $d_{S\text{-}SSS}(0), \ldots, d_{S\text{-}SSS}(126)$ is mapped to the subcarrier with index from 5 to 131, respectively, and the remaining subcarriers (i.e., with index 0, 1, 2, 3, 4) are set as 0, wherein the subcarrier index is within the 132 subcarriers for S-SSB. An illustration of this example is shown in Example 4 of FIG. 22.

In new radio (NR) Rel-15, synchronization signals and physical broadcast channel block (SSB) is supported, wherein an SSB compromises of four consecutive orthogonal frequency division multiplexing (OFDM) symbols in time domain, and 20 consecutive RBs in frequency domain. Moreover, the center 12 RBs of the first symbol in a SSB are mapped for primary synchronization signal (PSS), the second and forth symbols in a SSB are mapped for PBCH, and the third symbol in a SSB is mapped for both secondary synchronization signal (SSS) and PBCH. An illustration of the composition of NR Rel-15 SSB is shown in FIG. 23.

Figure 23:
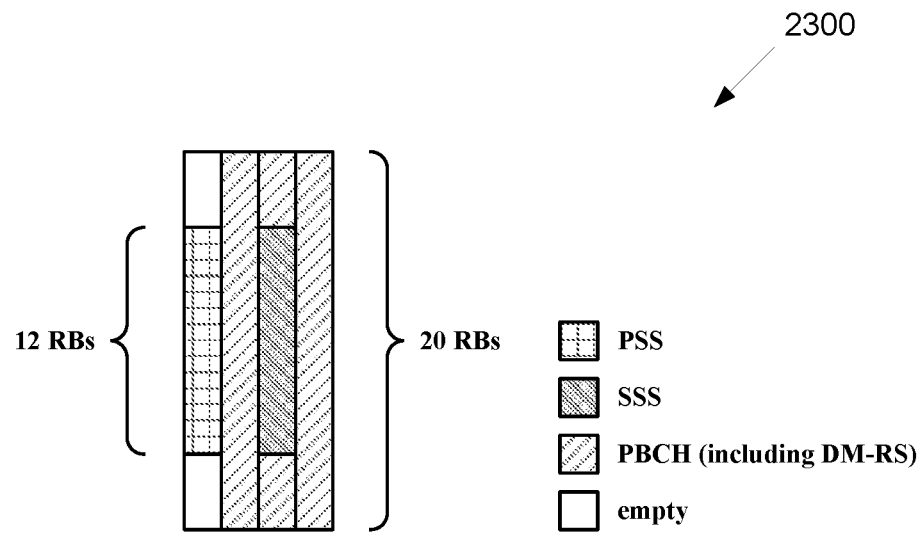
FIG. 23 illustrates an example NR SS/PBCH block composition according to embodiments of the present disclosure.

FIG. 23 illustrates an example NR SS/PBCH block composition 2300 according to embodiments of the present disclosure. An embodiment of the NR SS/PBCH block composition 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions. Other embodiments are used without departing from the scope of the present disclosure.

In every RB mapped for PBCH, 3 out of the 12 resource elements (REs) are mapped for the demodulation reference signal (DM-RS) of PBCH, wherein the 3 REs are uniformly distributed in the RB with their locations based on cell ID. An illustration of the DM-RS RE locations within an RB of PBCH is shown in FIG. 24.

Figure 24:
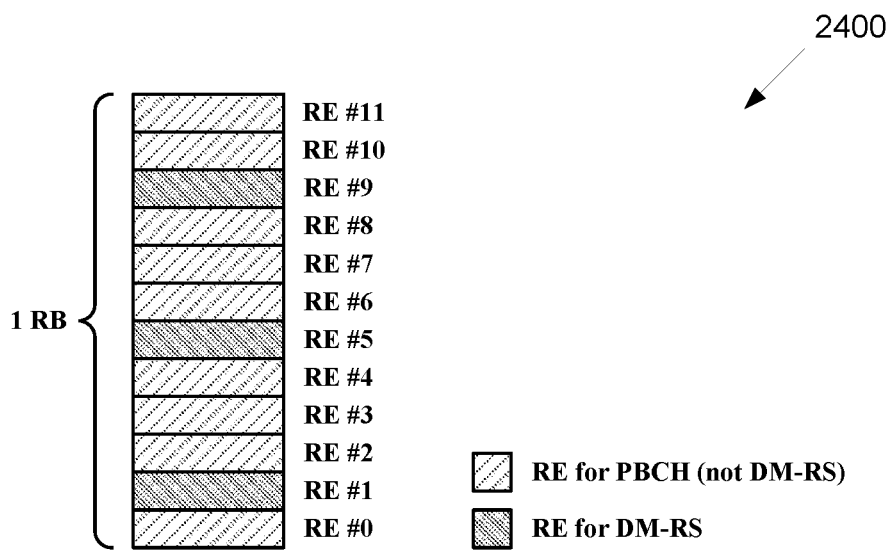
FIG. 24 illustrates an example NR DMRS RE locations within an RB of PBCH according to embodiments of the present disclosure.

FIG. 24 illustrates an example NR DMRS RE locations within an RB of PBCH 2400 according to embodiments of the present disclosure. An embodiment of the NR DMRS RE locations within an RB of PBCH 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions. Other embodiments are used without departing from the scope of the present disclosure.

The sequence for DM-RS of PBCH is generated based on a PN sequence with initial condition given by $2^{11}*(i\_SSB+1)(\text{floor}(N\_ID\^{}cell/4)+1)+2^{6}*(i\_SSB+1)+(N\_ID\^{}cell \mod 4)$, wherein i_SSB is the 3 LSB of SSB index when the maximum number of SSBs is at least 8, and i_SSB is the combination of half frame indicator and SSB index when the maximum number of SSBs is 4, N_ID^cell is the cell ID, and wherein and in the rest of this disclosure, "floor(X)" refers to the floor operation that gives the largest integer smaller than or equal to X, and "(Y mod Z)" refers to the modulo operation that gives the remainder after division of Y by Z.

Figure 25:
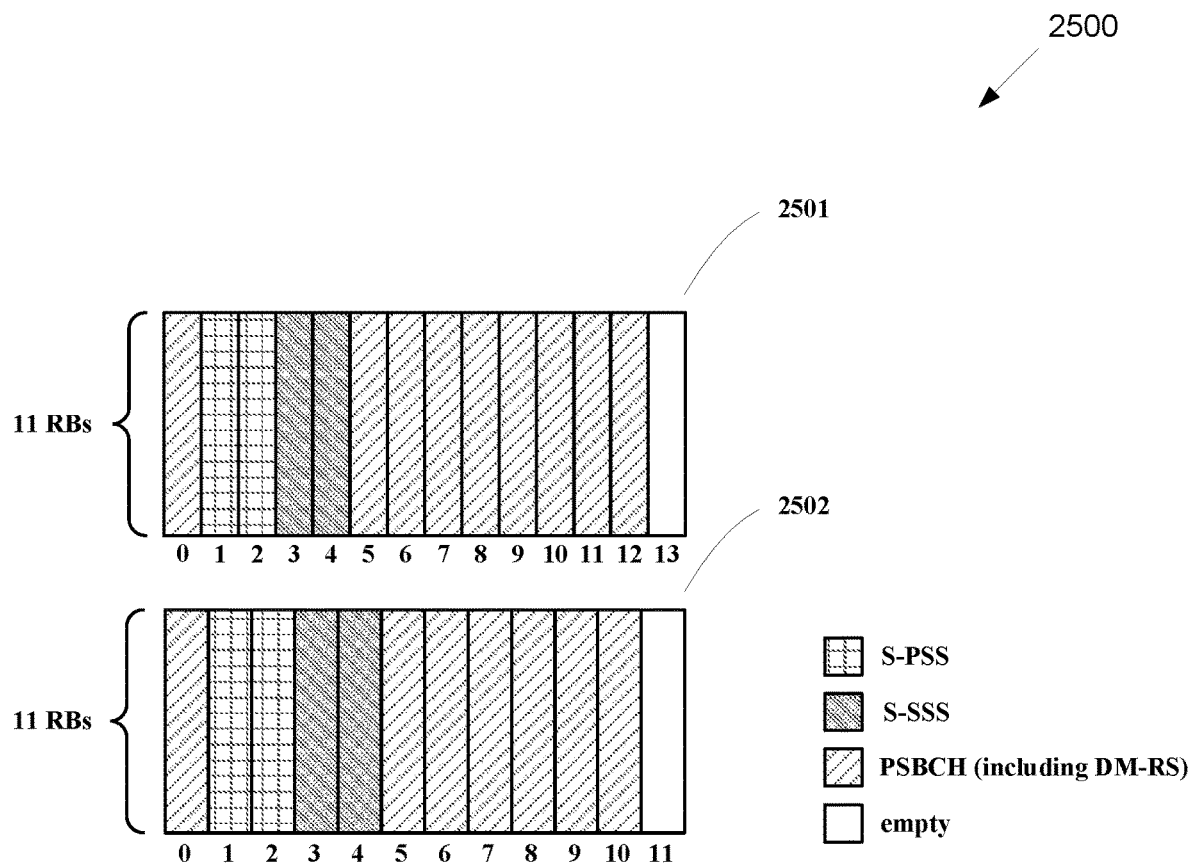
FIG. 25 illustrates an example S-SSB composition for normal cyclic prefix and extended cyclic prefix according to embodiments of the present disclosure.

FIG. 25 illustrates an example S-SSB composition for normal cyclic prefix and extended cyclic prefix 2500 according to embodiments of the present disclosure. An embodiment of the S-SSB composition for normal cyclic prefix and extended cyclic prefix 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions. Other embodiments are used without departing from the scope of the present disclosure.

In NR V2X, the sidelink synchronization signals and physical sidelink broadcast channel block (S-SSB) compromises components of sidelink primary synchronization signals, sidelink secondary synchronization signals, and physical sidelink broadcast channel (including DM-RS). An illustration of the composition of S-SSB is shown in 2501 and 2502 of FIG. 25, with respect to normal cyclic prefix (NCP) and extended cyclic prefix (ECP), respectively.

The present disclosure focuses on the design of DM-RS of PSBCH, including the determination of REs mapped for DM-RS of PSBCH, information carried by the DM-RS sequence of PSBCH, and the sequence generation for DM-RS.

The present disclosure focuses on the design of DM-RS of PSBCH, including determination of REs mapped for DM-RS of PSBCH; information carried by the DM-RS sequence of PSBCH; and sequence generation for DM-RS.

In one embodiment, the resource elements (REs) mapped for DM-RS of PSBCH are contained in the symbols mapped for PSBCH and interleaved frequency division multiplexing (IFDM) with REs mapped for PSBCH not including DM-RS.

In one example, the REs mapped for DM-RS of PSBCH are the same in different RBs within an OFDM symbol mapped for PSBCH in a S-SSB. In another example, the REs mapped for DM-RS of PSBCH are uniformly distributed in the RB within an OFDM symbol mapped for PSBCH in a S-SSB, and the REs mapped for DM-RS of PSBCH can be determined by two parameters, wherein a first parameter is the density of the DM-RS of PSBCH (e.g., denoted as d DMRS), which refers to the ratio between the number of REs mapped for DM-RS of PSBCH and the number of total REs within a RB (e.g., 12), and a second parameter is the starting RE in a RB (e.g., denoted as v_DMRS), which is the lowest RE mapped for DM-RS. The REs mapped for DM-RS in a RB can be determined as v_DMRS+k*(1/d DMRS), wherein k is all non-negative integers satisfying v_DMRS+k*(1/d DMRS)<12, when d DMRS is not 0. There is no RE mapped for DM-RS when d_DMRS is 0.

Figure 26:
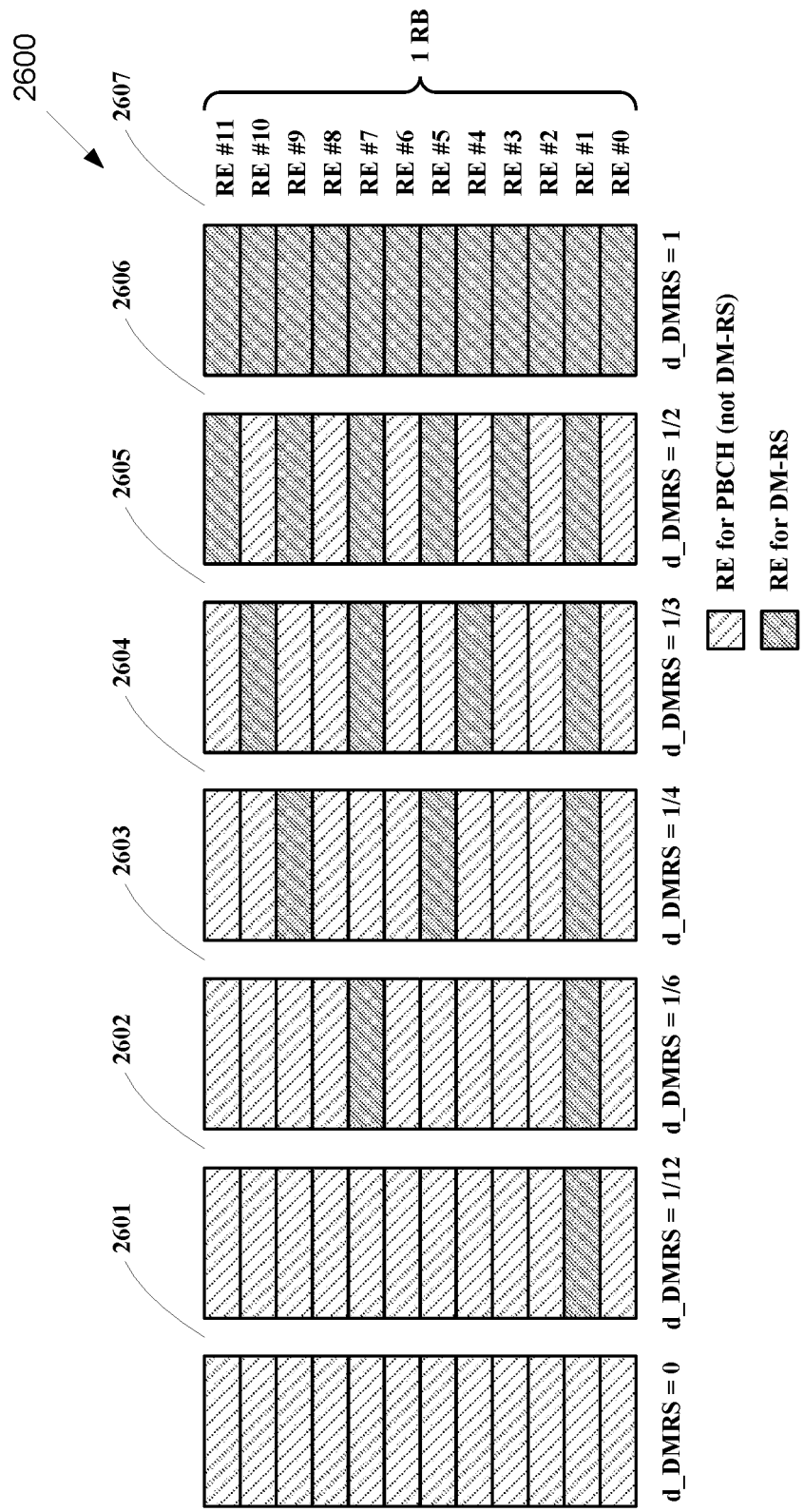
FIG. 26 illustrates an example RB structure with respect to different DM-RS density according to embodiments of the present disclosure.

FIG. 26 illustrates an example RB structure with respect to different DM-RS density 2600 according to embodiments of the present disclosure. An embodiment of the RB structure with respect to different DM-RS density 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions. Other embodiments are used without departing from the scope of the present disclosure.

An illustration of RB structure with respect to different DM-RS density is shown in FIG. 26, wherein in example 2601, 2602, 2603, 2604, 2605, 2606, and 2607, the densities of DM-RS are determined as 0, 1/12, 1/6, 1/4, 1/3, 1/2, and 1, respectively; and in example 2602, 2603, 2604, 2605, 2606, and 2607, the starting REs for DM-RS are determined as 1, 1, 1, 1, 1, and 0, respectively.

The following examples are with respect to the density of DM-RS of PSBCH (e.g., denoted as d_DMRS).

In one example, the same density of DM-RS is assumed for all symbols mapped for PSBCH in a S-SSB. In one example, a density of DM-RS as 1/4 is assumed for all symbols mapped for PSBCH in a S-SSB. In another example, a density of DM-RS as 1/3 is assumed for all symbols mapped for PSBCH in a S-SSB.

In another example, the density of DM-RS can be different for symbols mapped for PSBCH in a S-SSB. In one example, a first density of DM-RS is used for the first symbol (e.g., symbol #0 in a slot) mapped for PSBCH in a S-SSB, and a second density of DM-RS is used for the remaining symbols (e.g., symbols #5 to #12 in a slot with NCP or symbol #5 to #10 in a slot with ECP as illustrated in FIG. 25). One instance for the first density of DM-RS can be 0. Another instance for the first density of DM-RS can be 1. One instance for the second density of DM-RS can be 1/3. Another instance for the second density of DM-RS can be 1/4.

In yet another example, the density of DM-RS can be different for S-SSB with respect to NCP and ECP. In one example, if the same density of DM-RS is assumed for all symbols mapped for PSBCH in a S-SSB, the same density of DM-RS for S-SSB with NCP can be larger than the same density of DM-RS for S-SSB with ECP. In another example, if the same density of DM-RS is assumed for all symbols mapped for PSBCH in a S-SSB, the same density of DM-RS for S-SSB with NCP can be smaller than the same density of DM-RS for S-SSB with ECP. In yet another example, if different density of DM-RS is assumed for the first symbol and the remaining symbols of a S-SSB, the density of DM-RS for the first symbol of S-SSB can be the same for NCP and ECP (e.g., 0), and the density of DM-RS for the remaining symbols of S-SSB can be different for NCP and ECP (e.g., NCP has larger DM-RS density).

In yet another embodiment, the same density of DM-RS is assumed for all symbols mapped for PSBCH in a S-SSB, and the same density is (pre-)configured.

In yet another embodiment, the density of DM-RS for the first symbol mapped for PSBCH in a S-SSB can be fixed (e.g., 0), and the density of DM-RS for the remaining symbols mapped for PSBCH in a S-SSB can be (pre-)configured.

The following examples are with respect to the starting RE for DM-RS in an RB mapped for PSBCH (e.g., denoted as v_DMRS).

In one example, the starting RE for DM-RS is fixed, e.g., fixed as a non-negative integer smaller than 1/d_DMRS. For one example, when d_DMRS=1/4, the starting RE v_DMRS can be fixed as one of 0, or 1, or 2, or 3. For another example, when d_DMRS=1/3, the starting RE v_DMRS can be fixed as one of 0, or 1, or 2.

In another example, the starting RE for DM-RS is determined by the sidelink synchronization ID. For one example, the starting RE for DM-RS can be determined as (N_ID mod 1/d_DMRS), wherein N_ID is the sidelink synchronization ID. For another example, the starting RE for DM-RS can be determined as (N_ID mod 2), wherein N_ID is the sidelink synchronization ID. For yet another example, the starting RE for DM-RS can be determined as 2*(N_ID mod 2), wherein N_ID is the sidelink synchronization ID. For yet another example, the starting RE for DM-RS can be determined as floor(N_ID/(672*d_DMRS)), wherein N_ID is the sidelink synchronization ID. For yet another example, the starting RE for DM-RS can be determined as floor(N_ID/336), wherein N_ID is the sidelink synchronization ID. For yet another example, the starting RE for DM-RS can be determined as 2*floor(N_ID/336), wherein N_ID is the sidelink synchronization ID.

In yet another example, the starting RE for DM-RS is (pre-)configured. In one example, there can be an independent indication of the starting RE for DM-RS. In another example, the starting RE can be associated with other (pre-)configuration(s), and no independent indication is required.

In yet another example, the starting RE for DM-RS can be different for different symbols. In one sub-example, the combination of different starting RE can be utilized to indicate information (e.g., priority information of synchronization source, or in-coverage/out-of-coverage indicator of the synchronization source, or the type of synchronization source).

Figure 27:
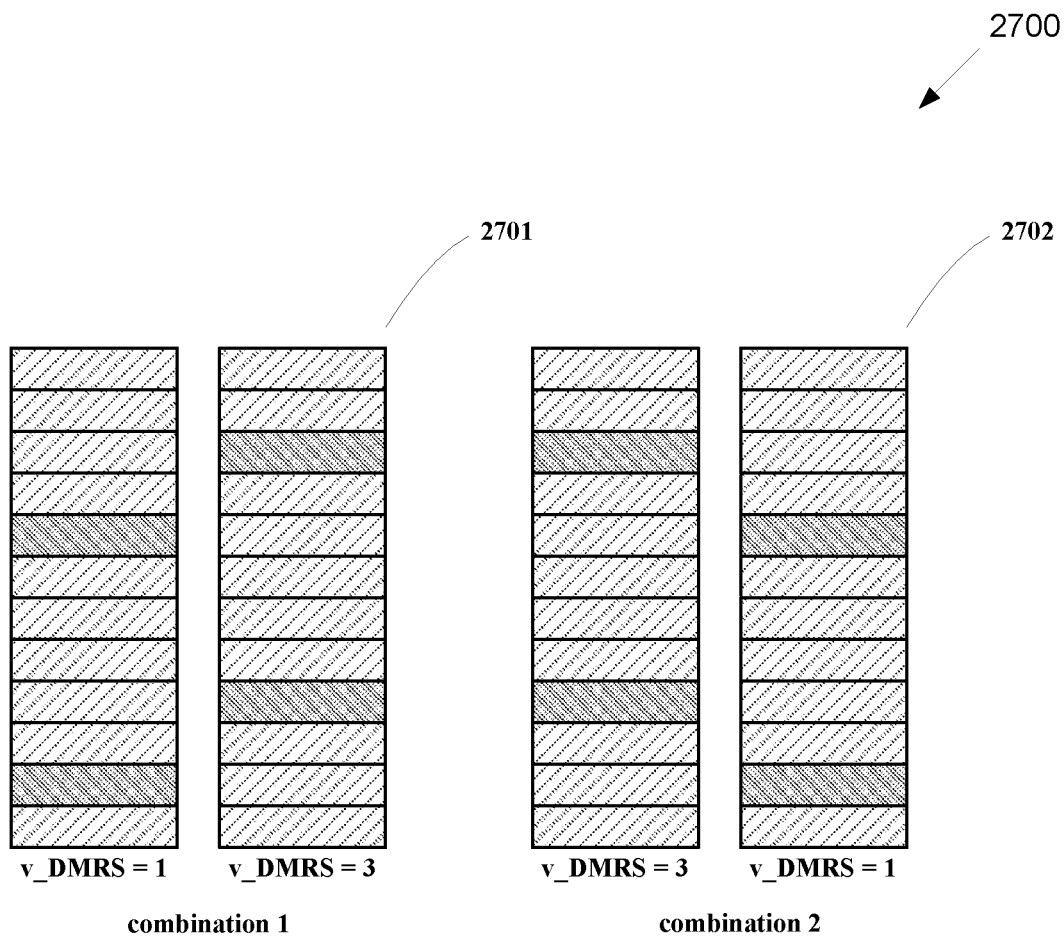
FIG. 27 illustrates an example indication for using the combination of different starting RE in PSBCH symbols according to embodiments of the present disclosure.

FIG. 27 illustrates an example indication for using the combination of different starting RE in PSBCH symbols 2700 according to embodiments of the present disclosure. An embodiment of the indication for using the combination of different starting RE in PSBCH symbols 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions. Other embodiments are used without departing from the scope of the present disclosure.

FIG. 27 illustrates an example indication method for using the combination of different starting RE in PSBCH symbols. The combination of different value of v_DMRS in different symbols for PSBCH can be utilized to indicate information.

In one embodiment, at least one or combination of the following examples and/or embodiments regarding the DM-RS of PSBCH, can be utilized to carry information.

In one example, the locations of RE mapped for DM-RS, as described in the previous embodiment of this disclosure.

In one example, the mapping order of the DM-RS sequence. For one example, the mapping order of either frequency-first-time-second or time-first-frequency-second can be utilized to carry 1-bit information. For another example, the mapping order of highest-to-lowest frequency or lowest-to-highest frequency can be utilized to carry 1-bit information.

In one example, the sequence generation of the DM-RS sequence. For one example, the initial condition for sequence generation can carry information. For another example, the cyclic shift applied to the sequence can carry information. For yet another example, phase shift applied to the sequence can carry information.

In one embodiment, at least one or combination of the following components can contribute to the information carried by the example(s) and/or embodiment(s) in the present disclosure.

In one example component, the information carried by DM-RS (including at least one of examples and/or embodiments including the RE locations, sequence mapping order, or sequence generation, as described in this disclosure) can be sidelink synchronization ID (e.g., denoted as N_ID in this disclosure, wherein 0≤N_ID≤671).

For one example, the sidelink synchronization ID can be divided into at least one part, and each part is carried by at least one examples and/or embodiments as described in this disclosure (e.g., a same part could be carried by more than one examples and/or embodiments).

In another example, the information carried by DM-RS (including at least one of embodiments and/or examples including the RE locations, sequence mapping order, or sequence generation, as described in this disclosure) can be timing related information (e.g., denoted as I_t in this disclosure).

For one example, the timing related information can be an index of the S-SSB within the (pre-)configured number of transmitted S-SSBs, e.g., I_t=i_SSB, wherein i_SSB is the index of S-SSB with 0≤i_SSB≤N_SSB−1, and N_SSB is the (pre-)configured number of transmitted S-SSBs.

For another example, the timing related information can be a part of the index of the S-SSB within the (pre-)configured number of transmitted S-SSBs, wherein e.g., the index of S-SSB can be denoted as i_SSB, wherein 0≤i_SSB≤N_SSB−1, and N_SSB is the (pre-)configured number of transmitted S-SSBs. For one sub-example, the part of the index is the K LSBs of i_SSB, e.g., I_t=(i_SSB mod 2^K), wherein K can be determined as K=min(log 2(N_SSB), K'), and K' is a predefined integer (e.g., representing the capacity of timing information carried by DM-RS), e.g., K=3. For another sub-example, the part of the index is the K MSBs of i_SSB, e.g., I_t=floor(i_SSB/(2^K)), wherein K can be determined as K=min(log 2(N_SSB), K'), and K' is a predefined integer (e.g., representing the capacity of timing information carried by DM-RS), e.g., K=3.

In yet another example, the timing related information can be related to the index of slot containing the corresponding S-SSB, wherein the index of slot can be denoted as s_SSB. For one sub-example, the part of the index is the K LSBs of s_SSB, e.g., I_t=(s_SSB mod 2^K), wherein K can be determined as K=min(log 2(N_SSB), K'), and K' is a predefined integer (e.g., representing the capacity of timing information carried by DM-RS), e.g., K=3. For another sub-example, the part of the index is the K MSBs of s_SSB, e.g., I_t=floor(s_SSB/(2^1K)), wherein K can be determined as K=min(log 2(N_SSB), K'), and K' is a predefined integer (e.g., representing the capacity of timing information carried by DM-RS), e.g., K=3.

In yet another example, the information carried by DM-RS (including at least one of embodiments and/or examples including the RE locations, sequence mapping order, or sequence generation, as described in this disclosure) can be QCL assumption related information (e.g., denoted as I_gcl in this disclosure).

In one example, there could be QCL assumption among S-SSBs within the same transmission period (e.g., either consecutively transmitted or not), and the QCL assumption related information carried by DM-RS can indicate same QCL assumption for the corresponding S-SSBs. In one example, sidelink UE can assume the S-SSBs with the same QCL assumption related information carried by DM-RS (e.g., same DM-RS sequence) are QCLed. In this example, the QCL assumption related information carried by DM-RS can be interpreted as the QCL assumption group index. In one example, there can be association between the QCL assumption group index and the S-SSB index, e.g., one-to-one mapping or one-to-multiple mapping.

In one sub-example, the number of groups of QCL assumptions is (pre-)configured as N_QCL, and 0≤I_qcl≤N_QCL−1.

In another sub-example, the maximum number of groups of QCL assumptions is fixed as M_QCL (e.g., per SCS and per FR), and 0≤I_qcl≤M_QCL−1.

In yet another sub-example, the number of groups of QCL assumptions is fixed as N_QCL, and 0≤I_qcl≤N_QCL−1.

In another example, there could be QCL assumption among S-SSBs within the same transmission period (e.g., either consecutively transmitted or not), and the QCL assumption related information carried by DM-RS can indicate a different QCL assumption for the corresponding S-SSBs. In one example, sidelink UE can assume the S-SSBs with the different QCL assumption related information carried by DM-RS (e.g., different DM-RS sequence using the same synchronization ID) are QCLed. In this example, the QCL assumption related information carried by DM-RS can be interpreted as the QCL assumption index within a QCL assumption group. In one example, there can be association between the QCL assumption index within a QCL assumption group and the S-SSB index, e.g., one-to-one mapping or one-to-multiple mapping.

In one sub-example, the number of groups of QCL assumptions is (pre-)configured as N_QCL, and 0≤I_qcl≤ (N_SSB/N_QCL)−1, and N_SSB is the (pre-)configured number of transmitted S-SSBs.

In another sub-example, the maximum number of groups of QCL assumptions is fixed as M_QCL (e.g., per SCS and per FR), and 0≤I_qcl≤(N_SSB/M_QCL)−1, and N_SSB is the (pre-)configured number of transmitted S-SSBs.

In yet another sub-example, the number of group of QCL assumptions is fixed as N_QCL, and 0≤I_qcl≤(N_SSB/N_QCL)−1, and N_SSB is the (pre-)configured number of transmitted S-SSBs.

In yet another example component, the information carried by DM-RS (including at least one of embodiments and/or examples including the RE locations, sequence mapping order, or sequence generation, as described in this disclosure) can be synchronization source related information (e.g., denoted as I_sync in this disclosure).

In one example, the synchronization source related information can be the priority information of synchronization source.

In another example, the synchronization source related information can be the in-coverage/out-of-coverage indicator of the synchronization source.

In yet another example, the synchronization source related information can be the type of synchronization source.

For yet another example, the synchronization source related information can be the combination of at least two of the above examples.

In one embodiment, the sequence for generating the DM-RS of PSBCH is according to a PN-sequence given by a QPSK modulated sequence constructed by XOR of two M-sequences, where one of the M-sequence $s\_1(n)$ is generated with a generator $g\_1(x)=x^{31}+x^3+1$ and an initial condition $c\_1=1$, and the other M-sequence $s\_2(n)$ is generated with a generator $g\_2(x)=x^{31}+x^3\pm x^2+x+1$ and an initial condition $c\_2$. There can be an output shift offset (e.g., denoted as N_c) such that the QPSK modulated sequence is given by $s(n)=(1-2*((s\_1(2*n+N\_c)+s\_1(2*n+N\_c))\mod 2))/\sqrt{2}+j*(1-2*((s\_1(2*n+N\_c+1)+s\_2(2*n+N\_c+1))\mod 2))/\sqrt{2}$ and $s(n)$ is truncated to the desired DM-RS sequence length and mapped to the REs for DM-RS.

In one example, the initial condition of s_2(n) only carries information about sidelink synchronization ID (e.g., denoted as N_ID) or a part of the sidelink synchronization ID.

In one example, the initial condition of s_2(n) is given by c_2=N_ID.

In another example, the initial condition of s_2(n) is given by c_2=floor(N_ID*d_DMRS), wherein d_DMRS is the density of DM-RS of PSBCH (e.g., d_DMRS=¼).

In yet another example, the initial condition of s_2(n) is given by c_2=k_1*(floor(N_ID*d_DMRS)+1)+k_2+k_3* (N_ID mod 1/d_DMRS), wherein d_DMRS is the density of DM-RS of PSBCH (e.g., d_DMRS=¼), wherein k_1, k_2, and k_3 are fixed integers. Combination of example values of k_1 and k_2 can be according to a row in TABLE 2.

In another example, the initial condition of s_2(n) only carries information about sidelink synchronization ID (e.g., denoted as N_ID) or a part of the sidelink synchronization ID, together with timing related information (e.g., denoted as I_t).

In one example, the initial condition of s_2(n) is given by c_2=k_1*(N_ID+1)*(I_t+1)+k_2*(I_t+1), wherein k_1 and k_2 are fixed integers. Combination of example values of k_1 and k_2 can be according to a row in TABLE 1.

In another example, the initial condition of s_2(n) is given by c_2=k_1*(floor(N_ID*d_DMRS)+1)*(I_t+1)+k_2* (I_t+1)+k_3*(N_ID mod 1/d_DMRS), wherein k_1, k_2, and k_3 are fixed integers. Combination of example values of k_1 and k_2 can be according to a row in TABLE 2.

In yet another example, the initial condition of s_2(n) only carries information about sidelink synchronization ID (e.g., denoted as N_ID) or a part of the sidelink synchronization ID, together with QCL assumption related information (e.g., denoted as I_qcl).

In one example, the initial condition of s_2(n) is given by c_2=k_1*(N_ID+1)*(I_qcl+1)+k_2*(I_qcl+1), wherein k_1 and k_2 are fixed integers. Combination of example values of k_1 and k_2 can be according to a row in TABLE 1.

In another example, the initial condition of s_2(n) is given by c_2=k_1*(floor(N_ID*d_DMRS)+1)*(I_qcl+1)+k_2* (I_qcl+1)+k_3*(N_ID mod 1/d_DMRS), wherein k_1, k_2, and k_3 are fixed integers. Combination of example values of k_1 and k_2 can be according to a row in TABLE 2.

In yet another example, the initial condition of s_2(n) only carries information about sidelink synchronization ID (e.g., denoted as N_ID) or a part of the sidelink synchronization ID, together with synchronization source related information (e.g., denoted as I_sync).

In one example, the initial condition of s_2(n) is given by c_2=k_1*(N_ID+1)*(I_sync+1)+k_2*(I_sync+1), wherein k_1 and k_2 are fixed integers. Combination of example values of k_1 and k_2 can be according to a row in TABLE 1.

In another example, the initial condition of s_2(n) is given by c_2=k_1*(floor(N_ID*d_DMRS)+1)*(I_sync+1)+k_2* (I_sync+1)+k_3(N_ID mod 1/d_DMRS), wherein k_1, k_2, and k_3 are fixed integers. Combination of example values of k_1 and k_2 can be according to a row in TABLE 2.

TABLE 1

Example values of parameters in sequence generation for DM-RS of PSBCH.

| Example index | k_1 | k_2 | Note |
|---|---|---|---|
| 1 | $2^{11}$ | $2^3$ | E.g., for maximum 3 bits info |
| 2 | $2^{11}$ | $2^5$ | E.g., for maximum 3 bits info |
| 3 | $2^{11}$ | $2^6$ | E.g., for maximum 3 bits info |
| 4 | $2^{12}$ | $2^3$ | E.g., for maximum 3 bits info |
| 5 | $2^{12}$ | $2^4$ | E.g., for maximum 3 bits info |
| 6 | $2^{12}$ | $2^6$ | E.g., for maximum 3 bits info |

TABLE 2

Example values of parameters in sequence generation for DM-RS of PSBCH.

| Example index | k_1 | k_2 | k_3 | Note |
|---|---|---|---|---|
| 1 | 2^11 | 2^6 | 1 | E.g., in general, |
| 2 | 2^6 | 1 | 0 | E.g., for maximum 3 bits info, density ¼ |
| 3 | 2^12 | 2^3 | 0 | E.g., for maximum 3 bits info, density ¼ |
| 4 | 2^11 | 2^3 | 0 | E.g., for maximum 3 bits info, density ¼ |
| 5 | 2^7 | 1 | 1 | E.g., for maximum 3 bits info, density ¼ |
| 6 | 2^9 | 2^1 | 1 | E.g., for maximum 3 bits info, density ¼ |
| 7 | 2^12 | 2^3 | 1 | E.g., for maximum 3 bits info, density ¼ |
| 8 | 2^11 | 2^3 | 1 | E.g., for maximum 3 bits info, density ¼ |

The payload of PBCH includes 24-bits master information block (MIB) from higher layer and 8-bits timing bits from physical layer, wherein the 8-bits timing bits from physical layer includes the 1st to 4th LSB of system frame number (SFN), half frame indicator, and the 4th to 6th LSB of SSB index for frequency range 2 (FR2), or 5th LSB of k_SSB and 2 reserved bits for frequency range 1 (FR1). Selected bits of PBCH payload are scrambled by the 1st-level scrambling, before CRC attachment, wherein the selected bits include MIB, and 4th and 1st LSB of SFN for both FR1 and FR2, and further include 5th LSB of k SSB and 2 reserved bits for FR1.

The scrambling sequence of the 1st-level scrambling is generated based on the cell ID as well as the 3rd and 2nd LSB of SFN. Another 2nd-level scrambling is applied after rate matching of the coded bits, wherein the scrambling sequence of the 2nd-level scrambling is generated based on the cell ID as well as the 1st and 2nd LSB of SSB index for L_max=4, or the 1st, 2nd, and 3rd LSB of SSB index for L_max=8 and L_max=64.

Figure 28A:
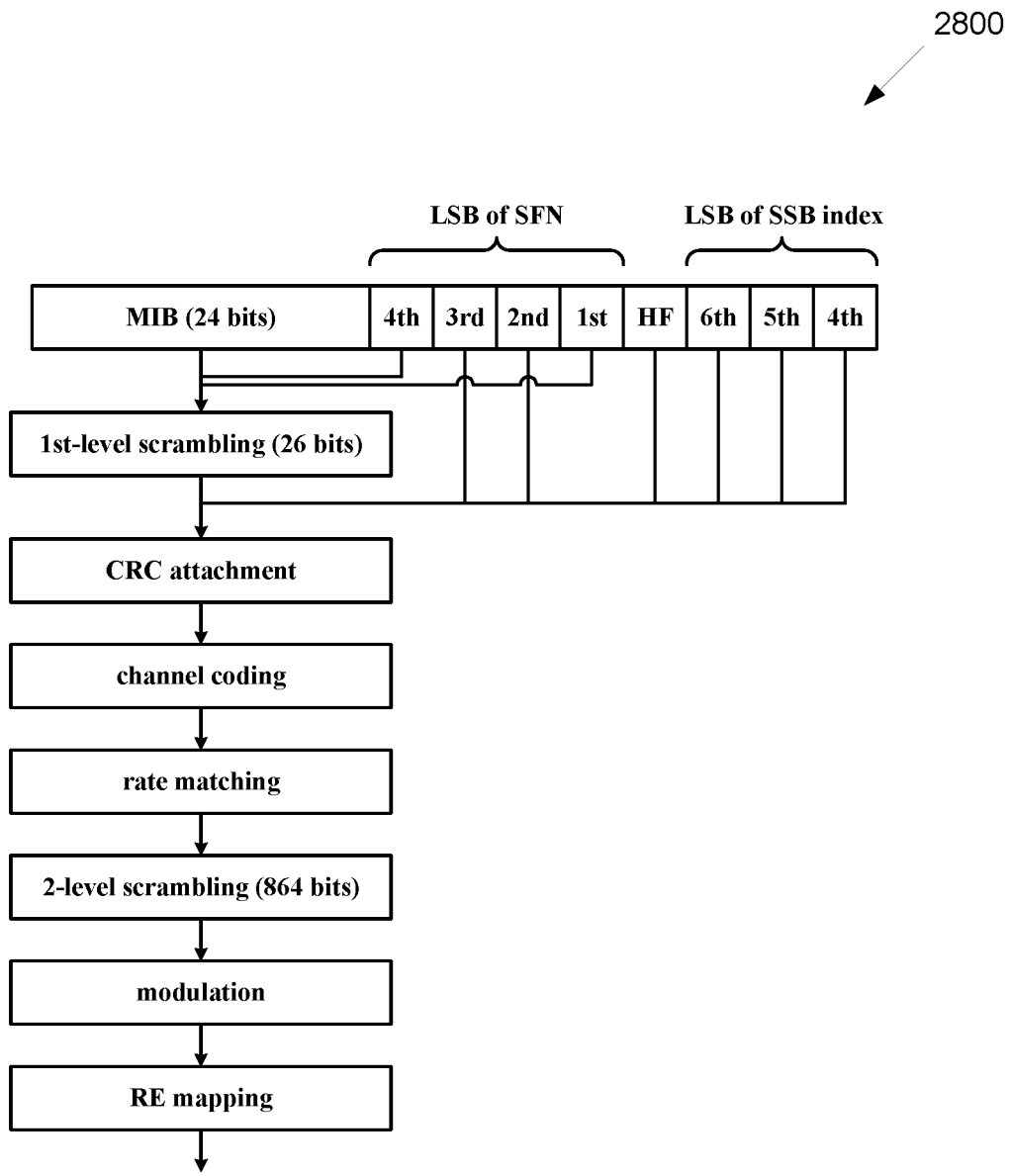
FIG. 28A illustrates an example scrambling of PBCH for FR2 according to embodiments of the present disclosure.

FIG. 28A illustrates an example scrambling of PBCH for FR2 2800 according to embodiments of the present disclosure. An embodiment of the scrambling of PBCH for FR2 2800 shown in FIG. 28A is for illustration only. One or more of the components illustrated in FIG. 28A can be implemented in specialized circuitry configured to perform the noted functions or one or more of the components can be implemented by one or more processors executing instructions to perform the noted functions. Other embodiments are used without departing from the scope of the present disclosure.

Figure 28B:
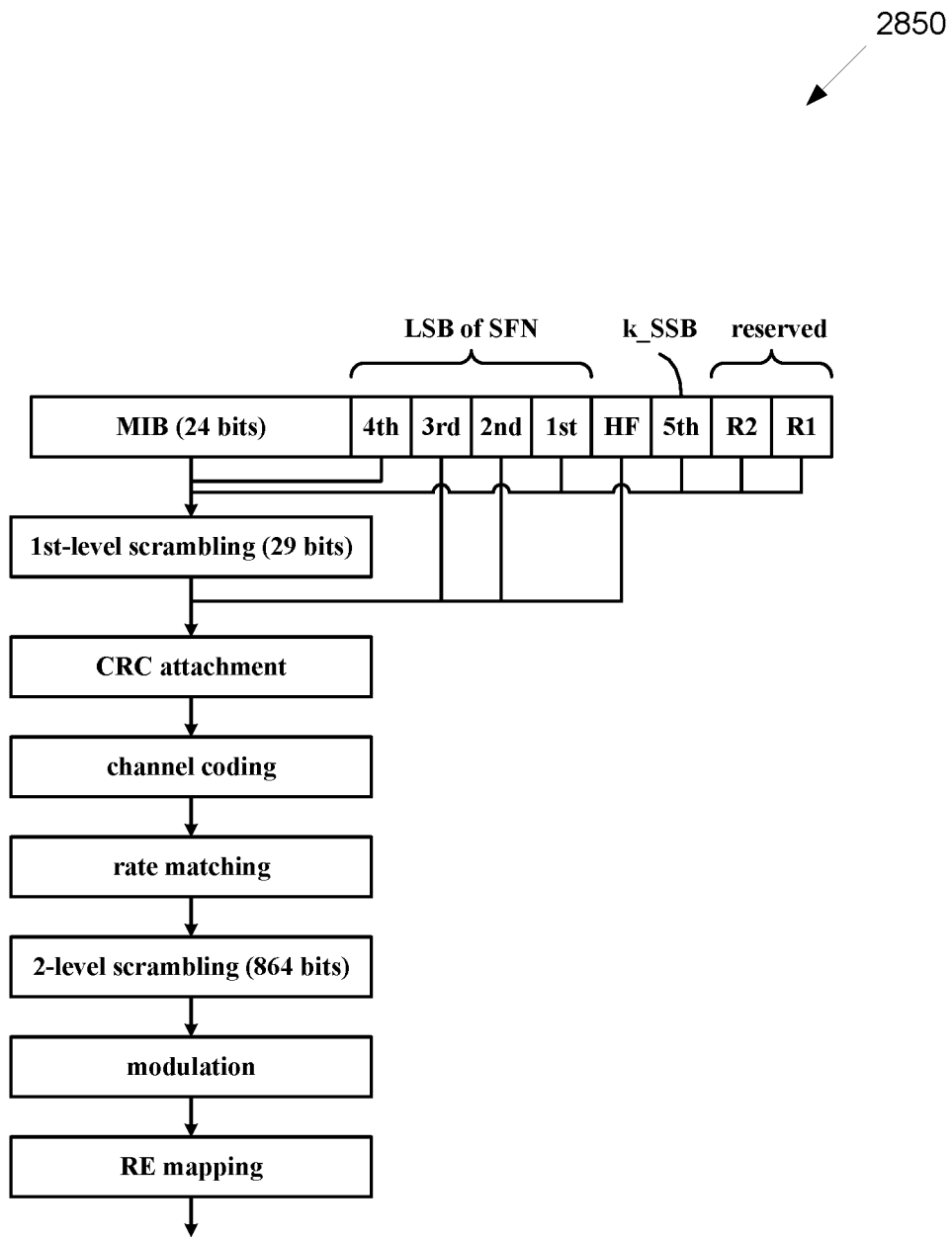
FIG. 28B illustrates an example scrambling of PBCH for FR1 according to embodiments of the present disclosure.

FIG. 28B illustrates an example scrambling of PBCH for FR1 2850 according to embodiments of the present disclosure. An embodiment of the scrambling of PBCH for FR1 2850 shown in FIG. 28B is for illustration only. One or more of the components illustrated in FIG. 28B can be implemented in specialized circuitry configured to perform the noted functions or one or more of the components can be implemented by one or more processors executing instructions to perform the noted functions. Other embodiments are used without departing from the scope of the present disclosure.

An illustration of the 1st-level and 2nd-level scrambling is shown in FIG. 28A and FIG. 28B for FR2 and FR1, respectively.

In NR V2X, the sidelink synchronization signals and physical sidelink broadcast channel block (S-SSB) compromises components of sidelink primary synchronization signals, sidelink secondary synchronization signals, and physical sidelink broadcast channel (including DM-RS). An illustration of the composition of S-SSB is shown in 2501 and 2502 of FIG. 25, with respect to normal cyclic prefix (NCP) and extended cyclic prefix (ECP), respectively.

The present disclosure focuses on the design of scrambling of PSBCH, including the procedure for scrambling, and the sequence generation for scrambling.

The present disclosure focuses on the scrambling of PSBCH, including procedure for scrambling; bits applicable to scrambling; timing information in PSBCH payload; and sequence generation for scrambling.

Figure 29:
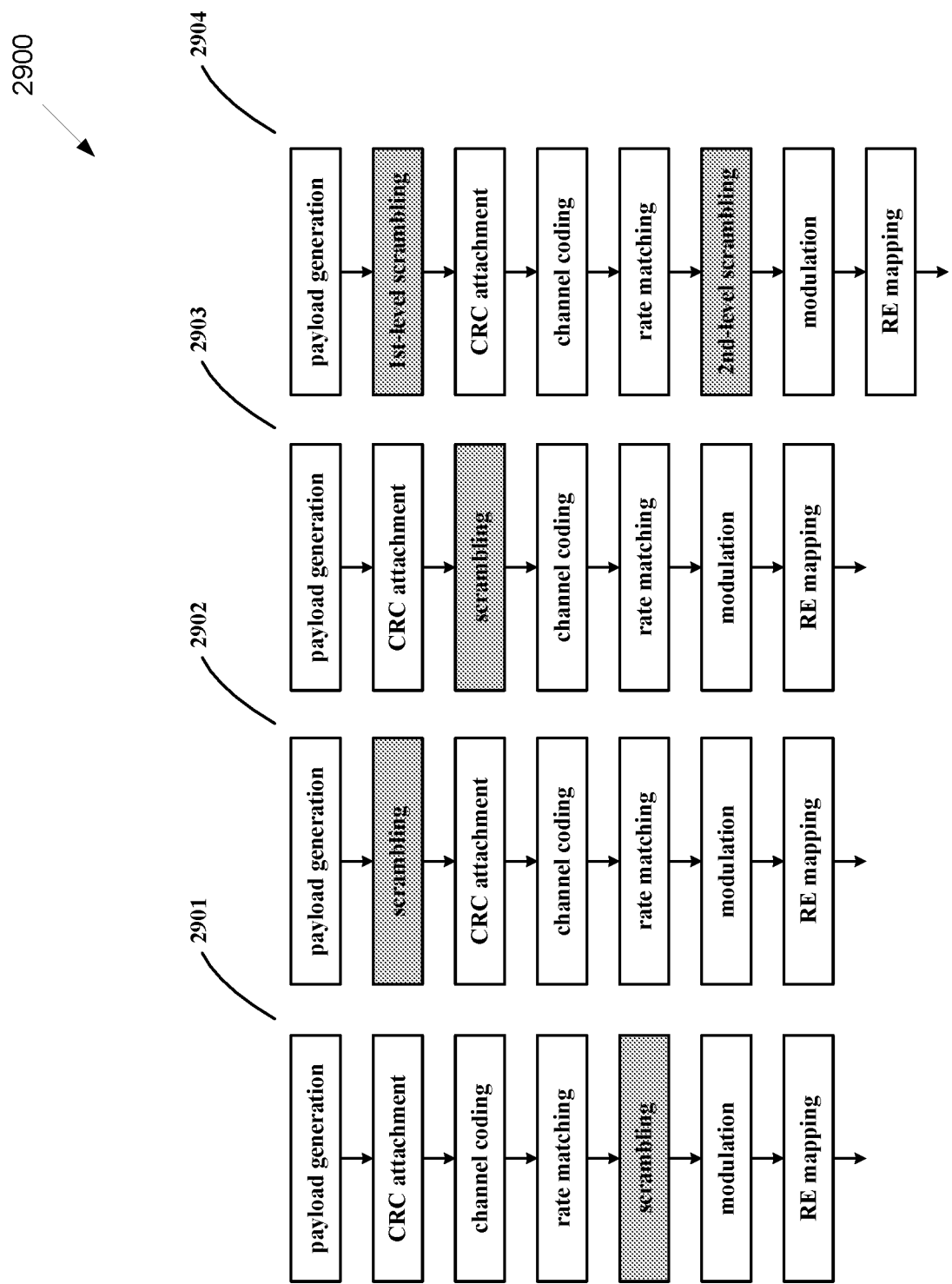
FIG. 29 illustrates an example scrambling procedures for PSBCH according to embodiments of the present disclosure.

FIG. 29 illustrates an example scrambling procedures for PSBCH 2900 according to embodiments of the present disclosure. An embodiment of the scrambling procedures for PSBCH 2900 shown in FIG. 29 is for illustration only. One or more of the components illustrated in FIG. 29 can be implemented in specialized circuitry configured to perform the noted functions or one or more of the components can be implemented by one or more processors executing instructions to perform the noted functions. Other embodiments are used without departing from the scope of the present disclosure.

In one example, only single-level of scrambling is supported, wherein the scrambling is after rate matching, and no scrambling is performed before CRC attachment. An illustration of the procedure of this example is shown in 2901 of FIG. 29.

In another example, only single-level of scrambling is supported, wherein the scrambling is before CRC attachment, and no scrambling is performed after rate matching. An illustration of the procedure of this example is shown in 2902 of FIG. 29.

In yet another example, only single-level of scrambling is supported, wherein the scrambling is after CRC attachment and before channel coding, and no scrambling is performed after rate matching. An illustration of the procedure of this example is shown in 2903 of FIG. 29.

In yet another example, two-level of scrambling is supported, wherein the 1st-level scrambling is before CRC attachment and the 2nd-level scrambling is after rate matching. An illustration of the procedure of this example is shown in 2904 of FIG. 29.

In one embodiment, all bits from the previous step are applicable to the scrambling procedure as described in the examples and/or embodiments of the present disclosure.

In one example, as in 2901 of FIG. 29, all the bits after rate matching can be applied to the scrambling procedure.

In another example, as in 2902 of FIG. 29, all the payload bits after payload generation can be applied to the scrambling procedure.

In yet another example, as in 2903 of FIG. 29, all the bits after CRC attachment (including the CRC bits) can be applied to the scrambling procedure.

In yet another example, as in 2904 of FIG. 29, all the payload bits after payload generation can be applied to the 1st-level scrambling procedure.

In yet another example, as in 2904 of FIG. 29, all the bits after rate matching can be applied to the 2nd-level scrambling procedure.

In another embodiment, part of the bits from the previous step are applicable to the scrambling procedure as described in the example of this disclosure.

In one example, as in 2902 of FIG. 29, part of the payload bits after payload generation can be applied to the scrambling procedure, and the remaining part of the payload bits can be applied to the CRC attachment procedure without scrambling.

In another example, as in 2904 of FIG. 29, part of payload bits after payload generation can be applied to the 1st-level scrambling procedure, and the remaining part of the payload bits can be applied to the CRC attachment procedure without scrambling.

In one example for the scrambled part of the bits in PSBCH payload, bit(s) for S-SSB index (e.g., MSB or LSB) is not scrambled.

In another example for the scrambled part of the bits in PSBCH payload, bit(s) for DFN is not scrambled.

Figure 30:
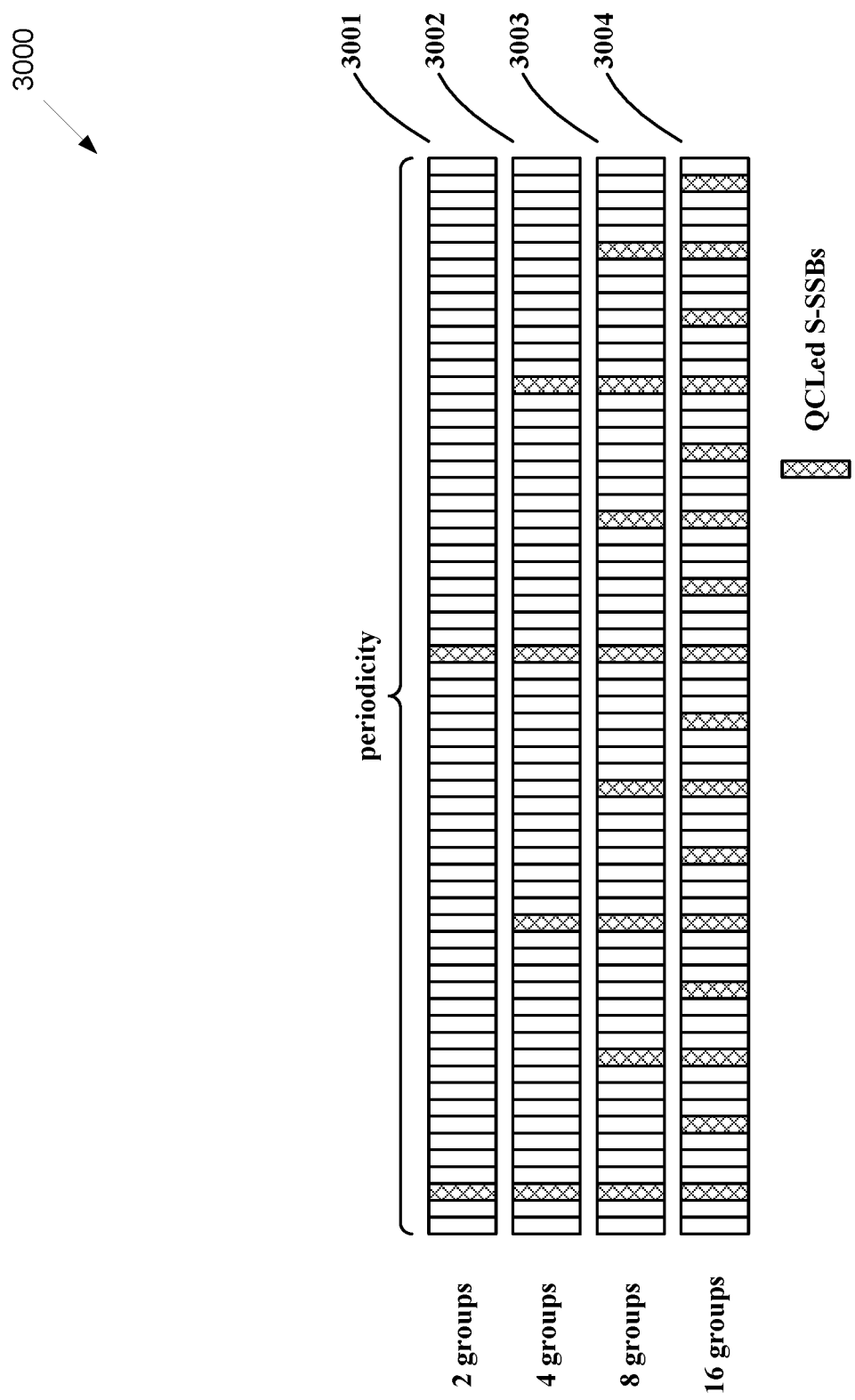
FIG. 30 illustrates an example QCLed S-SSB groups in a periodicity according to embodiments of the present disclosure.

FIG. 30 illustrates an example QCLed S-SSB groups in a periodicity 3000 according to embodiments of the present disclosure. An embodiment of the QCLed S-SSB groups in a periodicity 3000 shown in FIG. 30 is for illustration only. One or more of the components illustrated in FIG. 30 can be implemented in specialized circuitry configured to perform the noted functions or one or more of the components can be implemented by one or more processors executing instructions to perform the noted functions. Other embodiments are used without departing from the scope of the present disclosure.

In one example, if S-SSBs are transmitted in an interval of 80 ms within the periodicity of 160 ms (e.g., 2 groups), e.g., the S-SSBs are QCLed in an interval of 80 ms as in 3001 of FIG. 30, then the 4th LSB of DFN is not scrambled.

In another example, if S-SSBs are transmitted in an interval of 40 ms within the periodicity of 160 ms (e.g., 4 groups), e.g., the S-SSBs are QCLed in an interval of 40 ms as in 3002 of FIG. 30, then the 3rd and 4th LSB of DFN are not scrambled.

In yet another example, if S-SSBs are transmitted in an interval of 20 ms within the periodicity of 160 ms (e.g., 8 groups), e.g., the S-SSBs are QCLed in an interval of 20 ms as in 3003 of FIG. 30, then the 2nd, 3rd and 4th LSB of DFN are not scrambled.

In yet another example, if S-SSBs are transmitted in an interval of 10 ms within the periodicity of 160 ms (e.g., 16 groups), e.g., the S-SSBs are QCLed in an interval of 10 ms as in 3004 of FIG. 30, then the 1st, 2nd, 3rd and 4th LSB of DFN are not scrambled.

In yet another example for the scrambled part of the bits in PSBCH payload, bit for the half frame indicator is not scrambled.

In one example, the S-SSBs are QCLed in an interval of 5 ms, then the bit for the half frame indicator is not scrambled.

In yet another example for the scrambled part of the bits in PSBCH payload, bit(s) for the slot index within a frame is not scrambled.

In one example, if S-SSBs are QCLed within a frame, then the bit(s) for the slot index within a frame is not scrambled, wherein the bit(s) are common for the QCLed S-SSBs.

In yet another example for the scrambled part of the bits in PSBCH payload, bit(s) corresponding to the same QCL group is not scrambled.

In yet another example for the scrambled part of the bits in PSBCH payload, the combination of above examples and/or embodiments can be supported. For example, different combination can be supported according to (pre-)configuration of the transmitted S-SSBs.

In one example, the payload of PSBCH includes timing related information, wherein the timing related information includes at least one of a DFN, a slot index within a frame, or whole or part of an S-SSB index.

Figure 31:
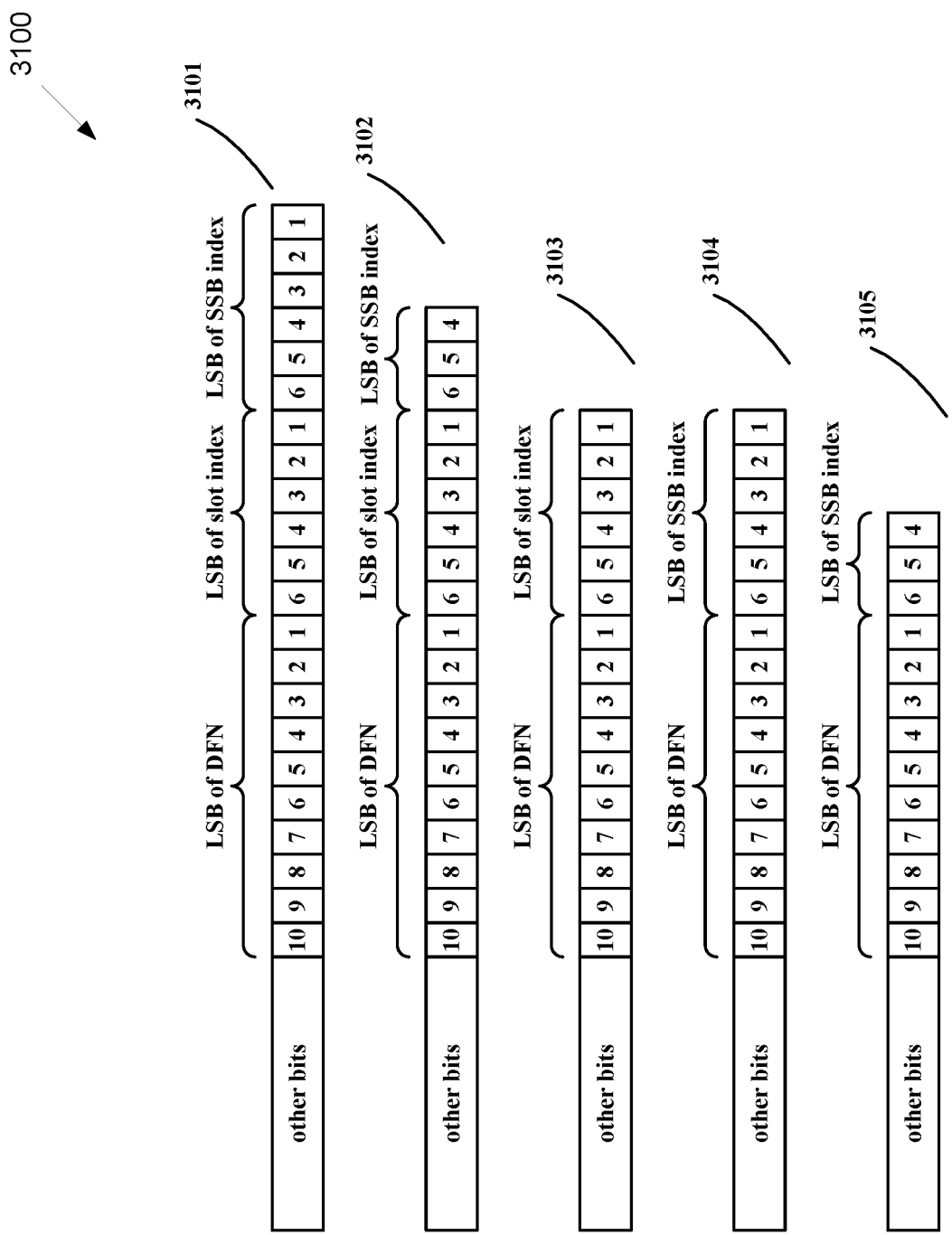
FIG. 31 illustrates an example PSBCH payload including timing related information according to embodiments of the present disclosure.

FIG. 31 illustrates an example PSBCH payload including timing related information 3100 according to embodiments of the present disclosure. An embodiment of the PSBCH payload including timing related information 3100 shown in FIG. 31 is for illustration only. One or more of the components illustrated in FIG. 31 can be implemented in specialized circuitry configured to perform the noted functions or one or more of the components can be implemented by one or more processors executing instructions to perform the noted functions. Other embodiments are used without departing from the scope of the present disclosure.

An illustration of the example PSBCH payload including timing related information is shown in FIG. 31, wherein 3101 illustrates PSBCH payload with 10 bits DFN, 6 bits slot index, and whole SSB index (e.g., 6 bits); 3102 illustrates PSBCH payload with 10 bits DFN, 6 bits slot index, and partial S-SSB index (e.g., 3 MSBs of S-SSB index); 3103 illustrates PSBCH payload with 10 bits DFN, and 6 bits slot index; 3104 illustrates PSBCH payload with 10 bits DFN, and whole SSB index (e.g., 6 bits); 3105 illustrates PSBCH payload with 10 bits DFN, and partial S-SSB index (e.g., 3 MSBs of S-SSB index).

In one embodiment, the bit-width of the slot index can be different according to the subcarrier spacing (SCS) of the S-SSB. For example, only the X LSBs of the 6 bits for slot index are utilized with the remaining 6-X bits reserved or set as default values, wherein X corresponds to the required number of bits for indicating the slot index with respect to the SCS of S-SSB. An example mapping between SCS of S-SSB and bit-width for slot index (e.g., X) is shown in TABLE 3.

TABLE 3

Example mapping between SCS of S-SSB and bit-width for slot index.

| SCS of S-SSB | Values for slot index | Bit-width for slot index (X) | Reserved or default number of bits |
| --- | --- | --- | --- |
| 15 kHz | 0, . . . , 9 | 3 bits | 3 bits |
| 30 kHz | 0, . . . , 19 | 4 bits | 2 bits |
| 60 kHz | 0, . . . , 39 | 5 bits | 1 bit |
| 120 kHz | 0, . . . , 79 | 6 bits | 0 bit |

In one embodiment, the bit-width for the S-SSB index included in the PSBCH payload can be based on the (pre-)configured number of transmitted S-SSBs. For example, only the Y LSBs of the 6 bits for S-SSB index are utilized with the remaining 6-Y bits reserved or set as default values, wherein Y corresponds to the required number of bits for indicating the S-SSB index within the (pre-)configured number of transmitted S-SSBs. An example mapping between number of bits for S-SSB index (e.g., Y) and (pre-)configured number of transmitted S-SSBs is shown in TABLE 4.

TABLE 4

Example mapping between number of bits for S-SSB index and (pre-)configured number of transmitted S-SSBs.

| Number of transmitted S-SSBs | Bit-width for S-SSB index (Y) | Reserved or default number of bits |
| --- | --- | --- |
| 1 | 0 bit | 6 bits |
| 2 | 1 bit | 5 bits |
| 4 | 2 bits | 4 bits |
| 8 | 3 bits | 3 bits |
| 16 | 4 bits | 2 bits |
| 32 | 5 bits | 1 bit |
| 64 | 6 bits | 0 bit |

In another embodiment, the bit-width for part of the S-SSB index included in the PSBCH payload can be based on the (pre-)configured number of transmitted S-SSBs. For example, assuming a Z-bit field is used to indicate part of the S-SSB index (e.g., Z MSBs of S-SSB index), then only Y bits of the Z bits are utilized with the remaining Z-Y bits reserved or set as default values, wherein Y corresponds to the utilized number of bits for indicating part of the S-SSB index within the (pre-)configured number of transmitted S-SSBs. An example mapping between number of utilized bits for S-SSB index (e.g., Y), bit-width of field in payload (e.g., Z), and (pre-) configured number of transmitted S-SSBs is shown in TABLE 5.

TABLE 5

Example mapping between number of utilized bits for S-SSB index, bit-width of field in payload, and (pre-)configured number of transmitted S-SSBs.

| Number of transmitted S-SSBs | Bit-width of field in payload (Z) | Number of bits utilized (Y) | Reserved or default number of bits |
|---|---|---|---|
| 1 | 1 | 0 bit | 1 bit |
| 2 | 1 | 0 bit | 1 bit |
| 4 | 1 | 0 bit | 1 bit |
| 8 | 1 | 0 bit | 1 bit |
| 16 | 1 | 0 bit | 1 bit |
| 32 | 1 | 0 bit | 1 bit |
| 64 | 1 | 1 bit | 0 bit |
| 1 | 2 | 0 bit | 2 bits |
| 2 | 2 | 0 bit | 2 bits |
| 4 | 2 | 0 bit | 2 bits |
| 8 | 2 | 0 bit | 2 bits |
| 16 | 2 | 0 bit | 2 bits |
| 32 | 2 | 1 bit | 1 bit |
| 64 | 2 | 2 bits | 0 bit |
| 1 | 3 | 0 bit | 3 bits |
| 2 | 3 | 0 bit | 3 bits |
| 4 | 3 | 0 bit | 3 bits |
| 8 | 3 | 0 bit | 3 bits |
| 16 | 3 | 1 bit | 2 bits |
| 32 | 3 | 2 bits | 1 bit |
| 64 | 3 | 3 bits | 0 bit |
| 1 | 4 | 0 bit | 4 bits |
| 2 | 4 | 0 bit | 4 bits |
| 4 | 4 | 0 bit | 4 bits |
| 8 | 4 | 1 bit | 3 bits |
| 16 | 4 | 2 bits | 2 bits |
| 32 | 4 | 3 bits | 1 bit |
| 64 | 4 | 4 bits | 0 bit |
| 1 | 5 | 0 bit | 5 bits |
| 2 | 5 | 0 bit | 5 bits |
| 4 | 5 | 1 bit | 4 bits |
| 8 | 5 | 2 bits | 3 bits |
| 16 | 5 | 3 bits | 2 bits |
| 32 | 5 | 4 bits | 1 bit |
| 64 | 5 | 5 bits | 0 bit |

In one embodiment, the generation of the scrambling sequence of PSBCH is at least based on the sidelink synchronization ID (e.g., denoted as $N\_ID$ in this disclosure).

In one example, the generation of the scrambling sequence of PSBCH is based on the sidelink synchronization ID only.

In one example, the scrambling sequence of PSBCH is generated for every slot containing an S-SSB including the corresponding PSBCH, and the initial condition of the scrambling sequence is based on the sidelink synchronization ID only. For instance, the sequence for generating the scrambling sequence of PSBCH is according to a PN-sequence given by a QPSK modulated sequence constructed by XOR of two M-sequences, where one of the M-sequence $s\_1(n)$ is generated with a generator $g\_1(x)=x^{31}+x^3+1$ and an initial condition $c\_1=1$, and the other M-sequence $s\_2(n)$ is generated with a generator $g\_2(x)=x^{31}+x^3+x^2+x+1$ and an initial condition $c\_2=N\_ID$, wherein $N\_ID$ is the sidelink synchronization ID. There can be an output shift offset (e.g., denoted as $N\_c$) such that the QPSK modulated sequence is given by $s(n)=(1-2*((s\_1(2*n+N\_c)+s\_1(2*n+N\_c)) \mod 2))/\sqrt{2}+j*(1-2*((s\_1(2*n+N\_c+1)+s\_2(2*n+N\_c+1)) \mod 2))/\sqrt{2}$ and $s(n)$ is truncated to the desired scrambling sequence length. In one example, the truncated scrambling sequence length can be different for S-SSBs with normal CP and extended CP.

In one example, the generation of the scrambling sequence of PSBCH is based on the sidelink synchronization ID together with extra information. In one example, if the extra information carried by the scrambling sequence of PSBCH is not carried by S-PSS, S-SSS, or DM-RS of PSBCH of the corresponding S-SSB, the extra information needs to be blindly detected by the sidelink UE.

In one example, the extra information for generating the scrambling sequence of PSBCH can be the S-SSB index or part of the S-SSB index.

In another example, the extra information for generating the scrambling sequence of PSBCH can be the QCL group index or index within a QCL group.

In yet another example, the extra information for generating the scrambling sequence of PSBCH can be information regarding the synchronization source (e.g., in-coverage/out-of-coverage indicator, and/or the type of synchronization source, and/or priority information of the synchronization source).

In one example for the generation method of the scrambling sequence, the sequence is generated according to a PN-sequence given by a QPSK modulated sequence constructed by XOR of two M-sequences, wherein the generation of the PN-sequence is based on the sidelink synchronization ID only (e.g., in the initial condition), and the generated PN-sequence is truncated into multiple non-overlapping segments, wherein each segment corresponds to one of the extra information carried by the scrambling sequence. In one example, the length of truncated segments of the scrambling sequence can be different for S-SSBs with normal CP and extended CP.

In one instance, the extra information can be S-SSB index, within the (pre-)configured number of transmitted S-SSBs (e.g., denote the number of transmitted S-SSBs are $N\_SSB$), and the generated PN-sequence is truncated into $N\_SSB$ number of non-overlapping segments, such that the i-th segment corresponds to $i*M$ to $(i+1)*M-1$ sequence index of the generated PN-sequence, wherein i is the S-SSB index such that $i=i\_SSB$ and $0 \leq i \leq N\_SSB-1$, and M is length of each segment, which for example can be different for S-SSB with normal CP and extended CP.

In another instance, the extra information can be S-SSB index or LSBs of the S-SSB index (e.g., at most K LSBs), within the (pre-)configured number of transmitted S-SSBs (e.g., denote the number of transmitted S-SSBs are $N\_SSB$), and the generated PN-sequence is truncated into non-overlapping segments, such that the i-th segment corresponds to $i*M$ to $(i+1)*M-1$ sequence index of the generated PN-sequence, wherein i is the S-SSB index if $N\_SSB \leq 2^K$, or i is the K LSBs of S-SSB index if $N\_SSB \geq 2^K$, and K is a predefined integer (e.g., K=3), and M is length of each segment, which for example can be different for S-SSB with normal CP and extended CP.

In yet another instance, the extra information can be S-SSB index or MSBs of the S-SSB index (e.g., at most K MSBs), within the (pre-)configured number of transmitted S-SSBs (e.g., denote the number of transmitted S-SSBs are $N\_SSB$), and the generated PN-sequence is truncated into non-overlapping segments, such that the i-th segment corresponds to (i−1)*M to i*M−1 sequence index of the generated PN-sequence, wherein i is the S-SSB index if $N\_SSB<2^K$, or i is the K MSBs of S-SSB index if $N\_SSB \geq 2^K$, and K is a predefined integer (e.g., K=3), and M is length of each segment, which for example can be different for S-SSB with normal CP and extended CP.

In yet another instance, the extra information can be part of the DFN, and the generated PN-sequence is truncated into non-overlapping segments, such that the i-th segment corresponds to i*M to (i+1)*M−1 sequence index of the generated PN-sequence, wherein i has a one-to-one mapping to part of the DFN, and M is length of each segment, which for example can be different for S-SSB with normal CP and extended CP.

In yet another instance, the extra information can be part of the slot index within a frame, and the generated PN-sequence is truncated into non-overlapping segments, such that the i-th segment corresponds to i*M to (i+1)*M−1 sequence index of the generated PN-sequence, wherein i has a one-to-one mapping to part of the slot index within a frame, and M is length of each segment, which for example can be different for S-SSB with normal CP and extended CP.

In yet another instance, the extra information can be QCL information (e.g., QCL group index or index within a QCL group), and the generated PN-sequence is truncated into non-overlapping segments, such that the i-th segment corresponds to i*M to (i+1)*M−1 sequence index of the generated PN-sequence, wherein i has a one-to-one mapping to the QCL information (e.g., QCL group index or index within a QCL group), and M is length of each segment, which for example can be different for S-SSB with normal CP and extended CP.

In yet another instance, the extra information can be information regarding the synchronization source (e.g., in-coverage/out-of-coverage indicator, and/or the type of synchronization source, and/or priority information of the synchronization source), and the generated PN-sequence is truncated into non-overlapping segments, such that the i-th segment corresponds to i*M to (i+1)*M−1 sequence index of the generated PN-sequence, wherein i has a one-to-one mapping to the information regarding the synchronization source (e.g., in-coverage/out-of-coverage indicator, and/or the type of synchronization source, and/or priority information of the synchronization source), and M is length of each segment, which for example can be different for S-SSB with normal CP and extended CP.

In one example for the generation method of the scrambling sequence, the sequence is generated according to a PN-sequence given by a QPSK modulated sequence constructed by XOR of two M-sequences, wherein the generation of the PN-sequence is based on the sidelink synchronization ID as well as the extra information, such that the initial condition of one of the M-sequences includes both the sidelink synchronization ID as well as the extra information.

In yet another example for the generation method of the scrambling sequence, the sequence is generated according to a PN-sequence given by a QPSK modulated sequence constructed by XOR of two M-sequences, wherein the generation of the PN-sequence is based on the sidelink synchronization ID only (e.g., in the initial condition), and the generated PN-sequence is performed with a cyclic shift, wherein the cyclic shift is based on the extra information carried by the scrambling sequence.

In yet another example for the generation method of the scrambling sequence, the sequence is generated according to a PN-sequence given by a QPSK modulated sequence constructed by XOR of two M-sequences, wherein the generation of the PN-sequence is based on the sidelink synchronization ID only (e.g., in the initial condition), and the generated PN-sequence is performed with a phase rotation, wherein the phase rotation is based on the extra information carried by the scrambling sequence.

Figure 32:
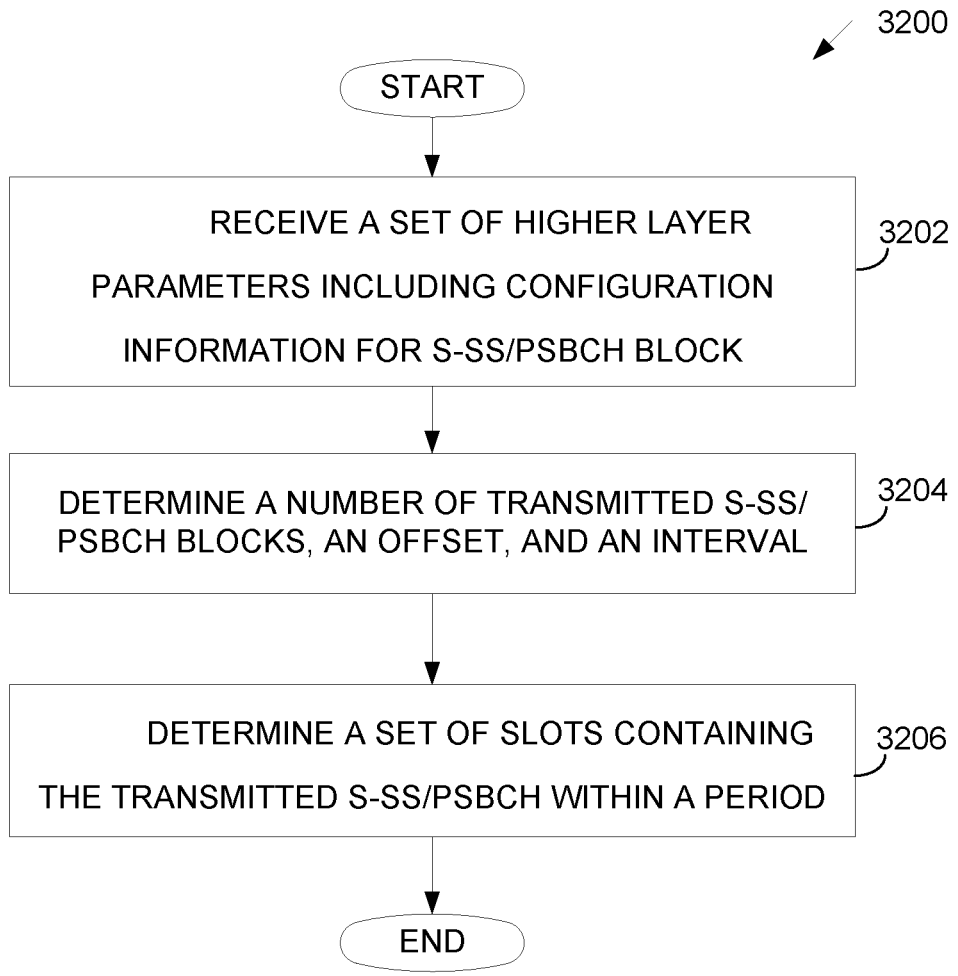
FIG. 32 illustrates a flow chart of a method for window size adaptation according to embodiments of the present disclosure.

FIG. 32 illustrates a flow chart of a method 3200 for window size adaptation according to embodiments of the present disclosure, as may be performed by a user equipment (UE) (e.g., 111-116 as illustrated in FIG. 1). An embodiment of the method 3200 shown in FIG. 32 is for illustration only. One or more of the components illustrated in FIG. 32 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 32, the method 3200 begins at step 3202. In step 3202, the UE receives a set of higher layer parameters including configuration information for sidelink synchronization signals and physical sidelink broadcast channel (S-SS/PSBCH) block.

In one embodiment, the configuration information for the S-SS/PSBCH block further includes a frequency location of the S-SS/PSBCH blocks and the frequency location of the 5-SS/PSBCH blocks corresponds to a subcarrier with an index 66 in the S-SS/PSBCH block.

In one embodiment, the configuration information for the S-SS/PSBCH block further includes information for a sidelink bandwidth part (SL BWP) and the information for the SL BWP includes a numerology of the SL BWP and a bandwidth of the SL BWP.

Subsequently, the UE in step 3204 determines, based on the configuration information for the S-SS/PSBCH block, a number of transmitted S-SS/PSBCH blocks ($N_{SSB}$), an offset for transmitted S-SS/PSBCH blocks ($O_{SSB}$), and an interval for transmitted S-SS/PSBCH blocks ($D_{SSB}$).

Finally, the UE in step 3206 determines a set of slots containing the transmitted S-SS/PSBCH blocks within a period for a transmission of the S-SS/PSBCH block, wherein an index of a slot in the set of slots is determined based on $O_{SSB}+I_{SSB}*I_{SSB}$, where $I_{SSB}$ is an index of the S-SS/PSBCH block with $0 \leq I_{SSB} \leq N_{SSB}-1$.

In one embodiment, the UE determines a numerology of the S-SS/PBCH block as the numerology of the SL BWP and determines a bandwidth of the S-SS/PBCH block as a part of the bandwidth of the SL BWP.

In one embodiment, the UE determines that a subcarrier with index 0 in the S-SS/PBCH block is aligned with a subcarrier with index 0 in a resource block (RB) in the SL BWP.

In one embodiment, the UE determines a scrambling sequence applied to a number of bits transmitted on a PSBCH.

In one embodiment, the UE initialize a generator for the scrambling sequence with $c_{init}=N_{ID}$, wherein $N_{ID}$ is a sidelink synchronization identification (SS-ID).

In one embodiment, the UE determines a sequence for generating a demodulation reference signal (DM-RS) for a PSBCH.

In one embodiment, the UE initialize a generator for generating the DM-RS with $c_{init}=N_{ID}$, wherein $N_{ID}$ is the SS-ID.

In one embodiment, the UE determines a length-127 sequence for a sidelink primary synchronization signal (S-PSS) from subcarriers with indices 2 to 128 in symbols mapped for the S-PSS, determines a length-127 sequence for a sidelink secondary synchronization signal (S-SSS) from subcarriers with indices 2 to 128 in symbols mapped for the S-SSS, determines subcarriers with indices 0, 1, 129, 130, and 131 as zero in symbols mapped for the S-PSS, and determines subcarriers with indices 0, 1, 129, 130, and 131 as zero in symbols mapped for the S-SSS.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims.

What is claimed is:

1. A user equipment (UE) in a wireless communication system, the UE comprising:
a transceiver configured to receive a set of higher layer parameters including configuration information for sidelink synchronization signals and physical sidelink broadcast channel (S-SS/PSBCH) block; and
a processor operably connected to the transceiver, the processor configured to:
determine, based on the configuration information for the S-SS/PSBCH block, a number of transmitted S-SS/PSBCH blocks ($N_{SSB}$) over a sidelink channel, an offset for the transmitted S-SS/PSBCH blocks ($O_{SSB}$), and an interval for each of the transmitted S-SS/PSBCH blocks ($D_{SSB}$), and
determine a set of slots containing the transmitted S-SS/PSBCH blocks within a period for a transmission of the S-SS/PSBCH block, wherein an index of a slot in the set of slots is determined based on $O_{SSB}+I_{SSB}*D_{SSB}$, where $I_{SSB}$ is an index of the S-SS/PSBCH block with $0 \leq I_{SSB} \leq N_{SSB}-1$.

2. The UE of claim 1, wherein:
the configuration information for the S-SS/PSBCH block further includes a frequency location of the transmitted S-SS/PSBCH blocks; and
the frequency location of the transmitted S-SS/PSBCH blocks corresponds to a subcarrier with an index 66 in the S-SS/PSBCH block.

3. The UE of claim 1, wherein:
the configuration information for the S-SS/PSBCH block further includes information for a sidelink bandwidth part (SL BWP); and
the information for the SL BWP includes a numerology of the SL BWP and a bandwidth of the SL BWP.

4. The UE of claim 3, wherein the processor is further configured to:
determine a numerology of the S-SS/PSBCH block as the numerology of the SL BWP; and
determine a bandwidth of the S-SS/PSBCH block as a part of the bandwidth of the SL BWP.

5. The UE of claim 3, wherein the processor is further configured to determine that a subcarrier with index 0 in the S-SS/PSBCH block is aligned with a subcarrier with index 0 in a resource block (RB) in the SL BWP.

6. The UE of claim 1, wherein the processor is further configured to determine a scrambling sequence applied to a number of bits transmitted on a PSBCH.

7. The UE of claim 6, wherein:
the processor is further configured to initialize a generator for the scrambling sequence with $c_{init}=N_{ID}$; and
$N_{ID}$ is a sidelink synchronization identification (SS-ID).

8. The UE of claim 1, wherein the processor is further configured to determine a sequence to generate a demodulation reference signal (DM-RS) for a PSBCH.

9. The UE of claim 8, wherein:
the processor is further configured to initialize a generator to generate the DM-RS with $c_{init}=N_{ID}$; and
$N_{ID}$ is the SS-ID.

10. The UE of claim 1, wherein the processor is further configured to:
determine a length-127 sequence for a sidelink primary synchronization signal (S-PSS) from subcarriers with indices 2 to 128 in symbols mapped for the S-PSS;
determine a length-127 sequence for a sidelink secondary synchronization signal (S-SSS) from subcarriers with indices 2 to 128 in symbols mapped for the S-SSS;
determine subcarriers with indices 0, 1, 129, 130, and 131 as zero in symbols mapped for the S-PSS; and
determine subcarriers with indices 0, 1, 129, 130, and 131 as zero in symbols mapped for the S-SSS.

11. A method of a user equipment (UE) in a wireless communication system, the method comprising:
receiving a set of higher layer parameters including configuration information for sidelink synchronization signals and physical sidelink broadcast channel (S-SS/PSBCH) block;
determining, based on the configuration information for the S-SS/PSBCH block, a number of transmitted S-SS/PSBCH blocks ($N_{SSB}$) over a sidelink channel, an offset for the transmitted S-SS/PSBCH blocks ($O_{SSB}$), and an interval for each of the transmitted S-SS/PSBCH blocks ($D_{SSB}$); and
determining a set of slots containing the transmitted S-SS/PSBCH blocks within a period for a transmission of the S-SS/PSBCH block, wherein an index of a slot in the set of slots is determined based on $O_{SSB}+I_{SSB}*D_{SSB}$, where $I_{SSB}$ is an index of the S-SS/PSBCH block with $0 \leq I_{SSB} \leq N_{SSB}-1$.

12. The method of claim 11, wherein:
the configuration information for the S-SS/PSBCH block further includes a frequency location of the transmitted S-SS/PSBCH blocks; and
the frequency location of the transmitted S-SS/PSBCH blocks corresponds to a subcarrier with an index 66 in the S-SS/PSBCH block.

13. The method of claim 11, wherein:
the configuration information for the S-SS/PSBCH block further includes information for a sidelink bandwidth part (SL BWP); and
the information for the SL BWP includes a numerology of the SL BWP and a bandwidth of the SL BWP.

14. The method of claim 13, further comprising:
determining a numerology of the S-SS/PSBCH block as the numerology of the SL BWP; and
determining a bandwidth of the S-SS/PSBCH block as a part of the bandwidth of the SL BWP.

15. The method of claim 13, further comprising determining that a subcarrier with index 0 in the S-SS/PSBCH block is aligned with a subcarrier with index 0 in a resource block (RB) in the SL BWP.

16. The method of claim 13, further comprising determining a scrambling sequence applied to a number of bits transmitted on a PSBCH.

17. The method of claim 16, further comprising initializing a generator for the scrambling sequence with $c_{init}=N_{ID}$, wherein $N_{ID}$ is a sidelink synchronization identification (SS-ID).

18. The method of claim 11, further comprising determining a sequence for generating a demodulation reference signal (DM-RS) for a PSBCH.

19. The method of claim 18, further comprising initializing a generator for generating the DM-RS with $c_{init}=N_{ID}$, wherein $N_{ID}$ is the SS-ID.

20. The method of claim 11, further comprising:
determining a length-127 sequence for a sidelink primary synchronization signal (S-PSS) from subcarriers with indices 2 to 128 in symbols mapped for the S-PSS;
determining a length-127 sequence for a sidelink secondary synchronization signal (S-SSS) from subcarriers with indices 2 to 128 in symbols mapped for the S-SSS;
determining subcarriers with indices 0, 1, 129, 130, and 131 as zero in symbols mapped for the S-PSS; and
determining subcarriers with indices 0, 1, 129, 130, and 131 as zero in symbols mapped for the S-SSS.

\* \* \* \* \*